US012271147B2

(12) United States Patent
Harada et al.

(10) Patent No.: US 12,271,147 B2
(45) Date of Patent: Apr. 8, 2025

(54) CARTRIDGE INCLUDING PRESSED PORTION TO BE PRESSED BY A PRESSING PORTION OF AN IMAGE FORMING APPARATUS

(71) Applicant: CANON KABUSHIKI KAISHA, Tokyo (JP)

(72) Inventors: Yuko Harada, Kanagawa (JP); Shunsuke Uratani, Shizuoka (JP); Makoto Hayashida, Shizuoka (JP); Tetsuo Uesugi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/207,736

(22) Filed: Jun. 9, 2023

(65) Prior Publication Data

US 2023/0418219 A1 Dec. 28, 2023

(51) Int. Cl.
*G03G 21/18* (2006.01)

(52) U.S. Cl.
CPC ..... *G03G 21/1825* (2013.01); *G03G 21/1814* (2013.01); *G03G 21/1842* (2013.01); *G03G 21/186* (2013.01); *G03G 2221/1657* (2013.01); *G03G 2221/1861* (2013.01); *G03G 2221/1884* (2013.01)

(58) Field of Classification Search
CPC ........... G03G 21/1825; G03G 21/1814; G03G 21/1842; G03G 21/186; G03G 2221/1657; G03G 2221/1861; G03G 2221/1884; G03G 21/1821
See application file for complete search history.

(56) References Cited

U.S. PATENT DOCUMENTS 8,571,445 B2 10/2013 Komatsu et al.
10,394,184 B2 8/2019 Kurihara
10,551,790 B2 2/2020 Komatsu et al.
11,061,366 B2 7/2021 Uesugi et al.
(Continued)

FOREIGN PATENT DOCUMENTS

EP 3 098 667 A1 11/2016
JP 2007-279175 A 10/2007
(Continued)

OTHER PUBLICATIONS

Co-pending U.S. Appl. No. 18/204,420, filed Jun. 1, 2023.
(Continued)

*Primary Examiner* — Arlene Heredia
*Assistant Examiner* — Laura Roth
(74) *Attorney, Agent, or Firm* — Venable LLP

(57) ABSTRACT

A cartridge includes a first unit including an image bearing member and a second unit including a developer bearing member. The second unit is swingable with respect to the first unit. The second unit includes a pressed portion to be pressed by a pressing member of the apparatus body. When viewed in an axial direction, (i) the swing axis and the pressed portion are arranged on opposite sides to each other with respect to a virtual straight line, (ii) the pressed portion, the swing axis, and the first axis are arranged in the named order in an interaxial direction, and (iii) a distance from the pressed portion to the swing axis in the interaxial direction is longer than a distance from the swing axis to the first axis in the interaxial direction.

18 Claims, 22 Drawing Sheets

(56) References Cited

U.S. PATENT DOCUMENTS

| | | | | |
|---|---|---|---|---|
| 11,112,749 | B1 * | 9/2021 | Jiang | G03G 21/1825 |
| 2005/0100367 | A1 * | 5/2005 | Uratani | G03G 15/0877 399/254 |
| 2006/0067730 | A1 | 3/2006 | Uratani et al. | |
| 2008/0253800 | A1 | 10/2008 | Uratani et al. | |
| 2009/0003876 | A1 * | 1/2009 | Maeshima | G03G 21/1842 399/111 |
| 2009/0245851 | A1 | 10/2009 | Hoshi et al. | |
| 2011/0170903 | A1 | 7/2011 | Hoshi et al. | |
| 2011/0255884 | A1 * | 10/2011 | Matsuda | G03G 15/55 399/26 |
| 2011/0311272 | A1 * | 12/2011 | Nittani | G03G 21/1825 399/111 |
| 2012/0243905 | A1 | 9/2012 | Uratani et al. | |
| 2012/0269540 | A1 | 10/2012 | Kawai et al. | |
| 2013/0129377 | A1 | 5/2013 | Satomura et al. | |
| 2013/0142541 | A1 | 6/2013 | Hayashida et al. | |
| 2013/0164029 | A1 | 6/2013 | Fukui et al. | |
| 2013/0177334 | A1 | 7/2013 | Nonaka et al. | |
| 2014/0112685 | A1 | 4/2014 | Komatsu et al. | |
| 2014/0140723 | A1 | 5/2014 | Hoshi et al. | |
| 2014/0334844 | A1 | 11/2014 | Fukui et al. | |
| 2015/0093146 | A1 * | 4/2015 | Sato | G03G 15/0896 399/119 |
| 2015/0220020 | A1 | 8/2015 | Hayashi et al. | |
| 2015/0234325 | A1 | 8/2015 | Satomura et al. | |
| 2015/0301497 | A1 * | 10/2015 | Kawanami | G03G 21/1647 399/121 |
| 2016/0179051 | A1 * | 6/2016 | Kim | G03G 21/1825 399/113 |
| 2016/0252877 | A1 | 9/2016 | Nakamura et al. | |
| 2016/0349664 | A1 | 12/2016 | Sawashima | |
| 2016/0370756 | A1 | 12/2016 | Komatsu et al. | |
| 2017/0248909 | A1 | 8/2017 | Nakamura et al. | |
| 2017/0261927 | A1 | 9/2017 | Sato et al. | |
| 2017/0293255 | A1 | 10/2017 | Uratani et al. | |
| 2017/0351214 | A1 | 12/2017 | Uesugi et al. | |
| 2018/0046130 | A1 | 2/2018 | Komatsu et al. | |
| 2019/0094792 | A1 | 3/2019 | Kurihara et al. | |
| 2019/0129356 | A1 | 5/2019 | Murakami et al. | |
| 2019/0354061 | A1 | 11/2019 | Uratani et al. | |
| 2020/0033791 | A1 | 1/2020 | Uesugi et al. | |
| 2020/0033792 | A1 | 1/2020 | Uesugi et al. | |
| 2020/0033793 | A1 | 1/2020 | Uesugi et al. | |
| 2020/0033794 | A1 | 1/2020 | Uesugi et al. | |
| 2020/0033795 | A1 | 1/2020 | Uesugi et al. | |
| 2020/0033796 | A1 | 1/2020 | Uesugi et al. | |
| 2020/0033797 | A1 | 1/2020 | Uesugi et al. | |
| 2020/0033798 | A1 | 1/2020 | Uesugi et al. | |
| 2020/0033799 | A1 | 1/2020 | Uesugi et al. | |
| 2020/0041954 | A1 | 2/2020 | Uesugi et al. | |
| 2020/0073323 | A1 | 3/2020 | Uesugi et al. | |
| 2020/0073324 | A1 | 3/2020 | Uesugi et al. | |
| 2020/0150581 | A1 | 5/2020 | Komatsu et al. | |
| 2020/0249622 | A1 | 8/2020 | Uratani et al. | |
| 2021/0003962 | A1 | 1/2021 | Carpenter et al. | |
| 2021/0109479 | A1 * | 4/2021 | Kubo | G03G 21/1814 |
| 2021/0286316 | A1 | 9/2021 | Murakami et al. | |
| 2021/0286317 | A1 | 9/2021 | Murakami et al. | |
| 2021/0341873 | A1 | 11/2021 | Komatsu et al. | |
| 2022/0066385 | A1 | 3/2022 | Uesugi et al. | |
| 2022/0187758 | A1 | 6/2022 | Murakami et al. | |
| 2023/0032541 | A1 | 2/2023 | Komatsu et al. | |
| 2023/0032591 | A1 | 2/2023 | Murakami et al. | |
| 2023/0195032 | A1 | 6/2023 | Murakami et al. | |

FOREIGN PATENT DOCUMENTS

| | | |
|---|---|---|
| JP | 2015-049421 A | 3/2015 |
| JP | 2019-061059 A | 4/2019 |

OTHER PUBLICATIONS

Co-pending U.S. Appl. No. 18/207,190, filed Jun. 8, 2023.
Co-pending U.S. Appl. No. 18/212,783, filed Jun. 22, 2023.
Co-pending U.S. Appl. No. 18/213,383, filed Jun. 23, 2023.
Co-pending U.S. Appl. No. 18/229,722, filed Aug. 3, 2023.
Nov. 15, 2023 Extended Search Report in European Patent Application Pub. No. 23 180 260.4.

* cited by examiner

CARTRIDGE INCLUDING PRESSED PORTION TO BE PRESSED BY A PRESSING PORTION OF AN IMAGE FORMING APPARATUS

BACKGROUND OF THE INVENTION

Field of the Invention

The present invention relates to cartridges that can be attached to and detached from an apparatus body of an image forming apparatus, and to image forming apparatuses for forming images on recording materials.

Description of the Related Art

In image forming apparatuses adopting an electrophotographic system, a cartridge including an image bearing member such as a photosensitive drum and a processing unit such as a developing roller acting on the image bearing member that is detachably attached integrally to an apparatus body of the image forming apparatus is used. Further, Japanese Patent Application Laid-Open Publication No. 2015-049421 discloses an image forming apparatus including a configuration in which, in a state where a process cartridge is attached to the apparatus body, a developing roller is separated from a photosensitive drum by a developing roller separating mechanism during a non-image-forming period.

In the image forming apparatus equipped with the developing roller separating mechanism, a configuration can be adopted in which, during attachment of the cartridge including a movable unit, a unit is caused to move by having a member provided on the apparatus body act on the cartridge. In such a case, there is a demand for a configuration that allows the unit to move smoothly when attaching the cartridge.

SUMMARY OF THE INVENTION

The present invention provides a configuration that allows a unit to move smoothly during attachment of the cartridge.

According to an aspect of the invention, a cartridge is configured to be attached to and detached from an apparatus body of an image forming apparatus, and the cartridge includes a first unit including an image bearing member configured to rotate about a first axis, and a second unit including a developer bearing member configured to rotate about a second axis and to bear and supply developer to the image bearing member, wherein the second unit is swingable with respect to the first unit about a swing axis that is parallel to the first axis, between a contact position in which the developer bearing member is in contact with the image bearing member and a separated position in which the developer bearing member is separated from the image bearing member, wherein the second unit includes a pressed portion to be pressed by a pressing member of the apparatus body, and is configured to be moved from the contact position to the separated position in a case where the pressed portion is pressed, and wherein, in a state where the second unit is positioned at the contact position, when viewed in an axial direction along the first axis, (i) the swing axis and the pressed portion are arranged on opposite sides to each other with respect to a virtual straight line connecting the first axis and the second axis, (ii) the pressed portion, the swing axis, and the first axis are arranged in the named order in an interaxial direction from the second axis toward the first axis along the virtual straight line, and (iii) a distance from the pressed portion to the swing axis in the interaxial direction is longer than a distance from the swing axis to the first axis in the interaxial direction.

According to another aspect of the invention, a cartridge is configured to be attached to and detached from an apparatus body of an image forming apparatus, and the cartridge includes a first unit including an image bearing member configured to rotate about a first axis, and a second unit including a developer bearing member configured to rotate about a second axis and to bear and supply developer to the image bearing member, wherein the cartridge is configured to be attached to the apparatus body in an attaching direction that is orthogonal to the first axis, wherein the second unit is swingable with respect to the first unit about a swing axis that is parallel to the first axis, between a contact position in which the developer bearing member is in contact with the image bearing member and a separated position in which the developer bearing member is separated from the image bearing member, wherein the second unit includes a pressed portion to be pressed by a pressing member of the apparatus body, and is configured to be moved from the contact position to the separated position in a case where the pressed portion is pressed, and wherein, in a state where the second unit is positioned at the contact position, when viewed in an axial direction along the first axis, (i) the swing axis and the pressed portion are arranged on opposite sides to each other with respect to a virtual straight line that passes the first axis and that extends in the attaching direction, (ii) the pressed portion, the swing axis, and the first axis are arranged in the named order in the attaching direction, and (iii) a distance from the pressed portion to the swing axis in the attaching direction is longer than a distance from the swing axis to the first axis in the attaching direction.

According to another aspect of the invention, a cartridge is configured to be attached to and detached from an apparatus body of an image forming apparatus, and the cartridge includes a first unit including an image bearing member configured to rotate about a first axis, and a second unit including a developer bearing member configured to rotate about a second axis and to bear and supply developer to the image bearing member, wherein the second unit is swingable with respect to the first unit about a swing axis that is parallel to the first axis, between a contact position in which the developer bearing member is in contact with the image bearing member and a separated position in which the developer bearing member is separated from the image bearing member, wherein the second unit includes a pressed portion to be pressed by a pressing member of the apparatus body, and is configured to be moved from the contact position to the separated position in a case where the pressed portion is pressed, and wherein, in a state where the second unit is positioned at the contact position, when viewed in an axial direction along the first axis, (i) the swing axis and the pressed portion are arranged on opposite sides to each other with respect to a virtual straight line connecting the first axis and the second axis, (ii) the pressed portion, the swing axis, and the first axis are arranged in the named order in an interaxial direction from the second axis toward the first axis along the virtual straight line, and (iii) a distance from the pressed portion to the swing axis in the interaxial direction is longer than a distance from the swing axis to a contact portion at which the image bearing member contacts the developer bearing member in the interaxial direction.

Further features of the present invention will become apparent from the following description of exemplary embodiments with reference to the attached drawings.

DESCRIPTION OF THE EMBODIMENTS

An apparatus according to the present disclosure will be described below with reference to the drawings.

In the following description, the term "image forming apparatus" refers to an apparatus for forming an image on a recording material, or recording medium, u sing toner serving as developer, and includes a single-function printer, a copying machine, and a multifunction device. Sheets that are used as the recording media can include paper such as normal paper and thick paper, plastic films such as overhead projector sheets, sheets of special shapes such as envelopes and index sheets, and cloth.

General Configuration of Printer

Figure 1:
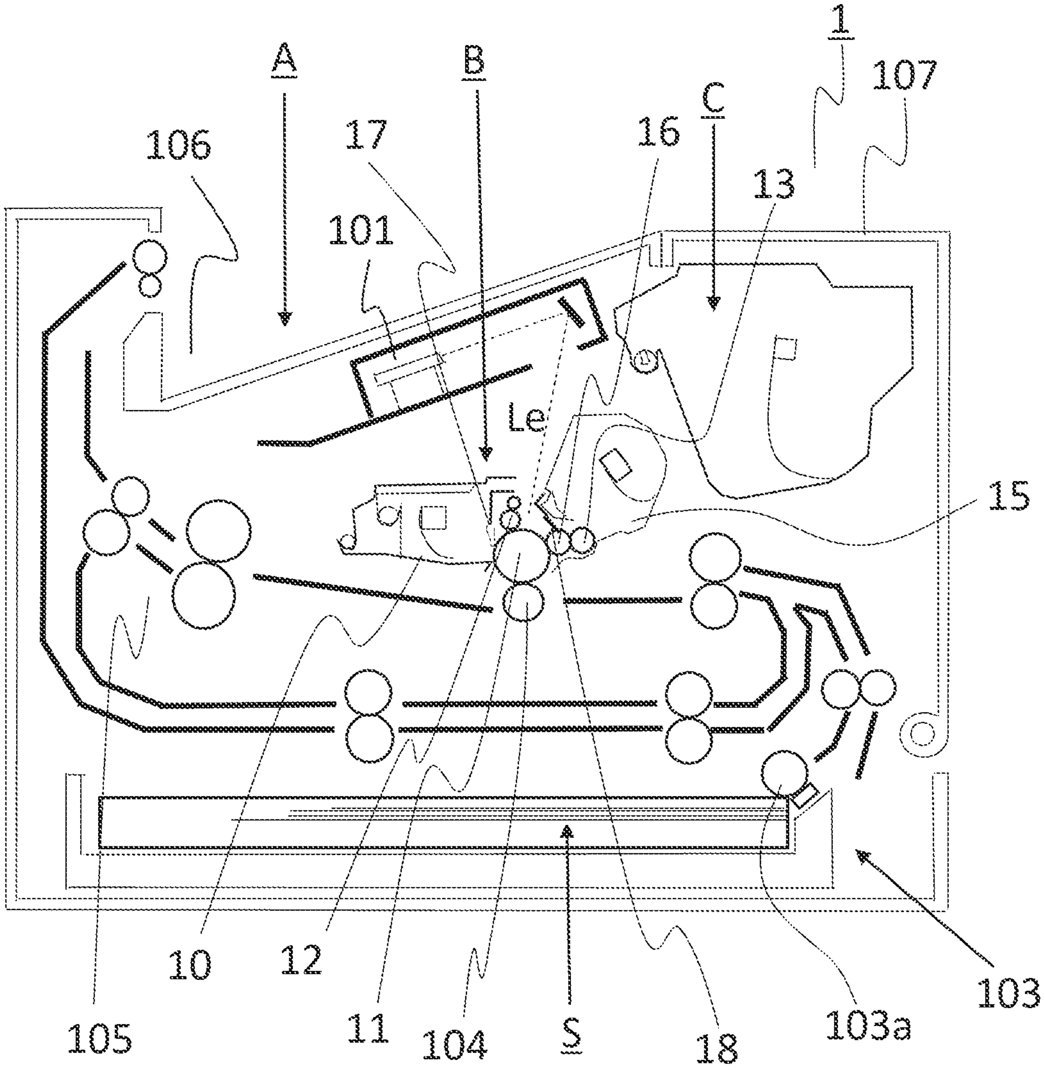
FIG. 1 is a schematic drawing of a printer according to one embodiment.

FIG. 1 is a schematic drawing illustrating a cross-sectional configuration of a laser beam printer, hereinafter referred to as a printer 1, serving as an image forming apparatus according to one embodiment. The printer 1 is composed of a printer body A, a process cartridge B, and a toner cartridge C.

The printer body A includes a sheet feeding unit 103, a transfer roller 104, a fixing unit 105, and a laser scanner 101. The process cartridge B can be attached to and detached from the printer body A. The process cartridge is a component in which an image bearing member and a process unit acting on the image bearing member are formed as a cartridge that can be detachably attached to the apparatus body of the image forming apparatus. The toner cartridge C is a cartridge that stores toner serving as developer and that is detachably attached to the image forming apparatus body. The printer body A can be referred to as a portion of the printer 1 excluding the process cartridge B and the toner cartridge C.

Figure 2:
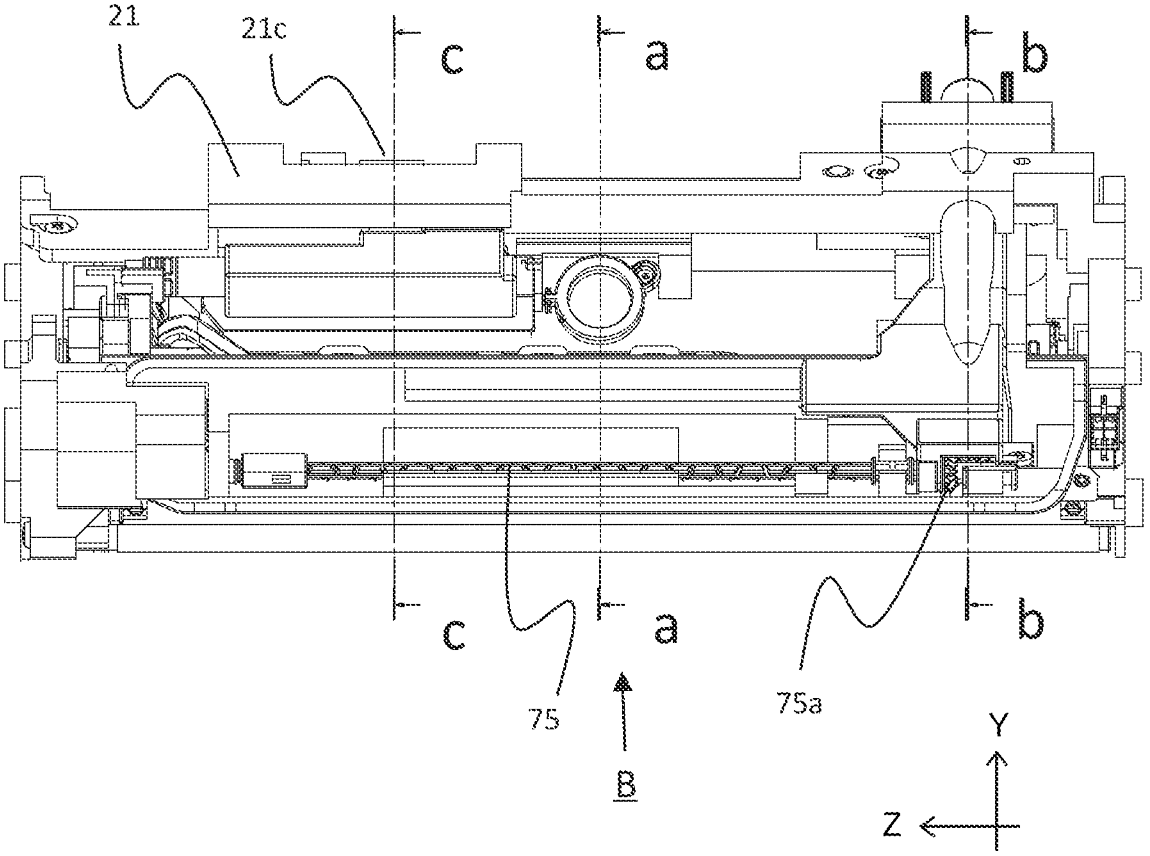
FIG. 2 is a front view of a process cartridge according to the embodiment.
Figure 3:
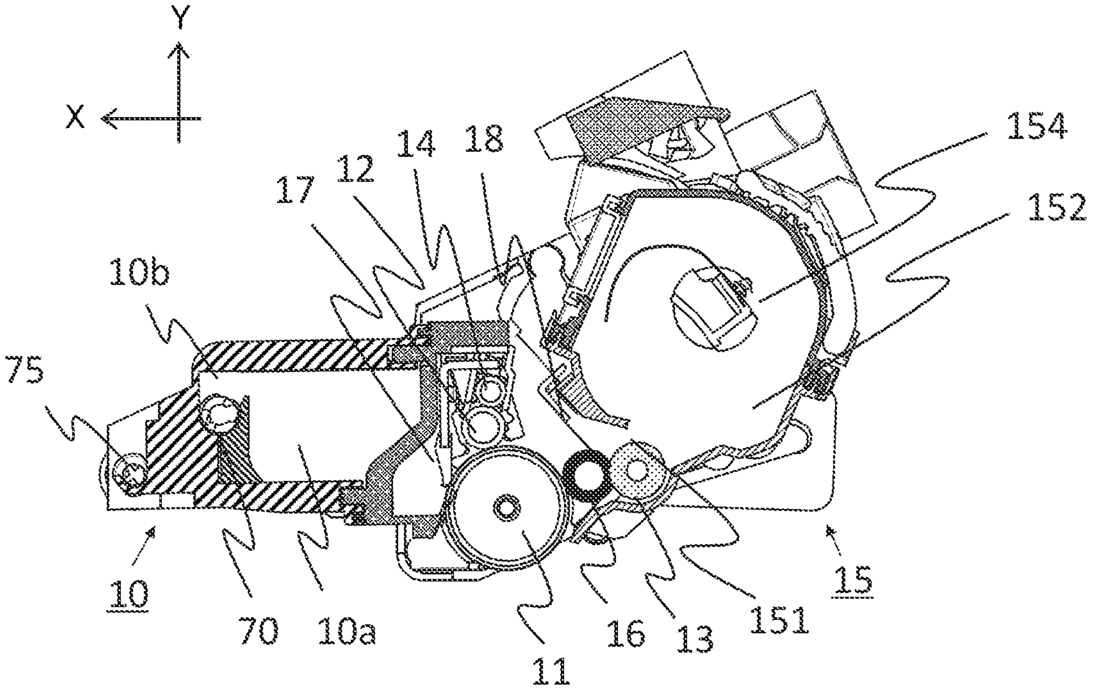
FIG. 3 is a cross-sectional view of the process cartridge according to the embodiment.
Figure 4:
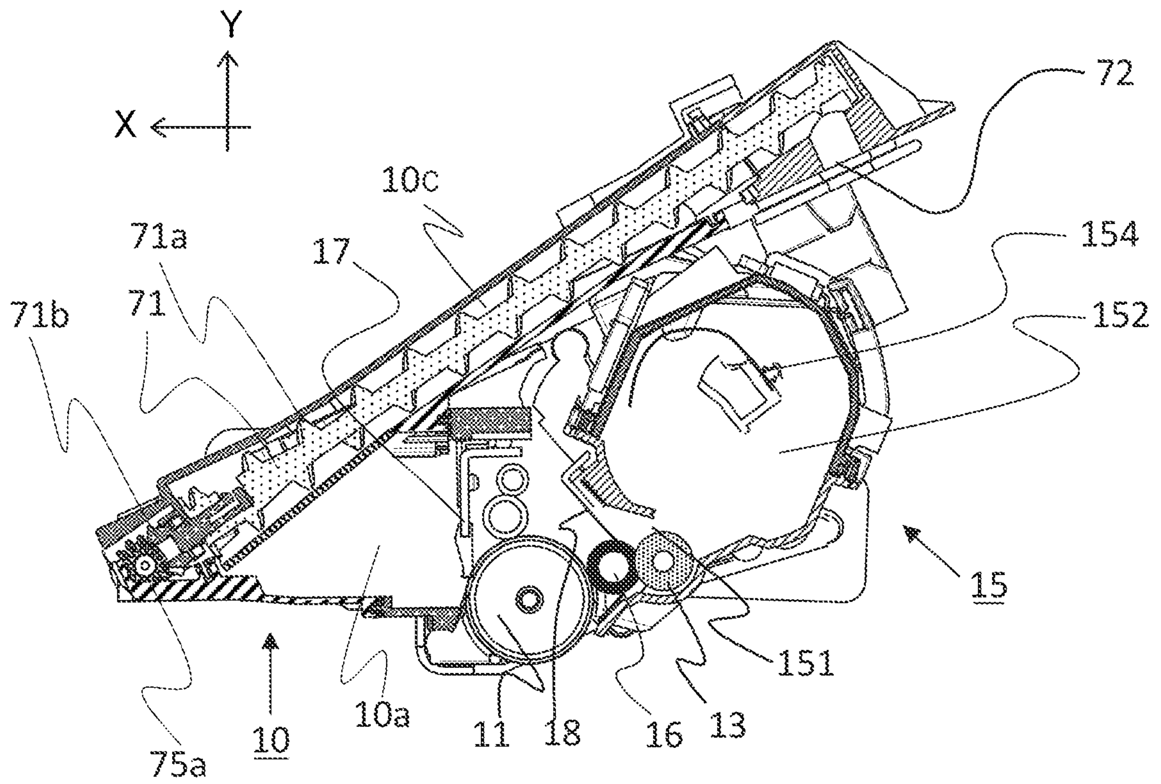
FIG. 4 is a cross-sectional view of the process cartridge according to the embodiment.
Figure 5:
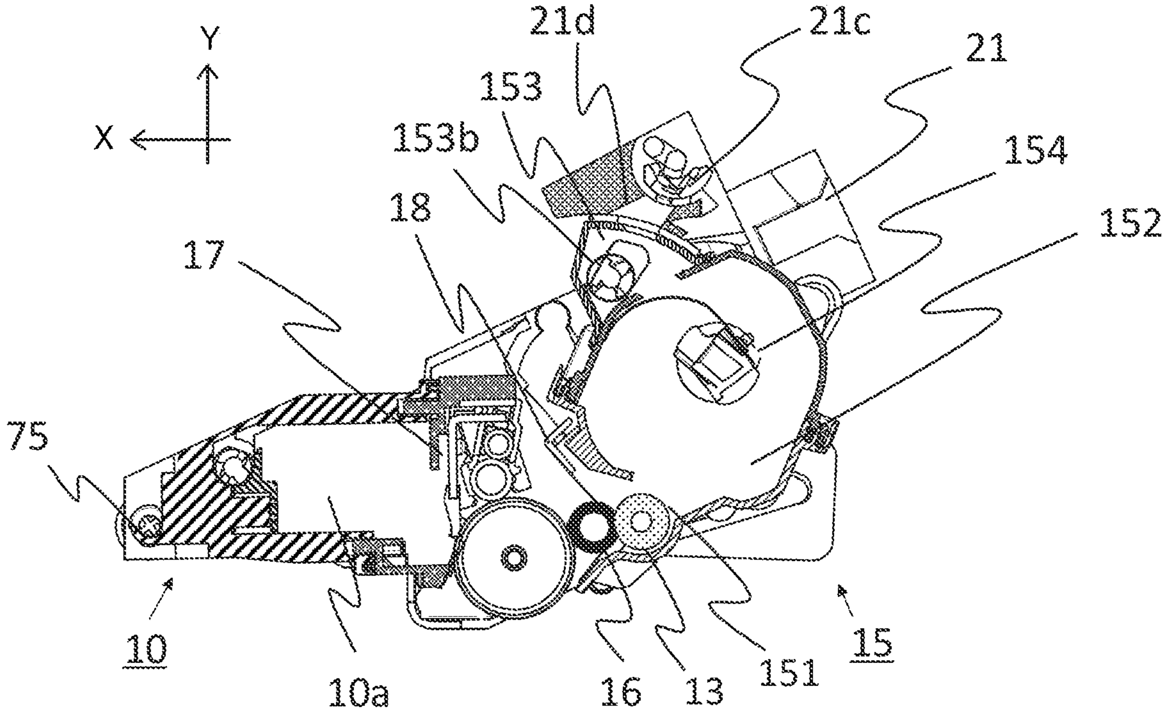
FIG. 5 is a cross-sectional view of the process cartridge according to the embodiment.

The process cartridge B will b e described with reference to FIGS. 2, 3, 4, and 5. FIG. 2 is a front view of the process cartridge B, that is, a view of the process cartridge B viewed from a left side of FIG. 1. FIG. 3 is a cross-sectional view of the process cartridge B, that is, an a-a cross section of FIG. 2. FIG. 4 is a cross-sectional view illustrating a second waste toner conveyance path 10*c* of the process cartridge B, that is, a b-b cross section of FIG. 2. FIG. 5 is a cross-sectional view illustrating a replenishing port of the process cartridge B, that is, a c-c cross section of FIG. 2.

Hereinafter, a vertical direction, i.e., vertically upper direction, of a state in which the process cartridge B and the toner cartridge C are attached to the printer body A and the printer body A is installed on a horizontal plane is denoted by arrow Y in FIG. 6. A longitudinal direction of the process cartridge B, i.e., a rotational axis direction of a photosensitive drum 11, is denoted by arrow Z. Further, a horizontal direction orthogonal to both the longitudinal direction, or arrow Z, and the vertical direction, or arrow Y, of the process cartridge B is denoted by arrow X. Further, the arrangement of elements and shapes of the process cartridges B and C will be described based on a state in which the process cartridges B and C are attached to the printer body A.

One end of the process cartridge B in the longitudinal direction from which side the process cartridge B mainly receives driving force from the printer body A is referred to as a drive side, i.e., left side of FIG. 2, and an opposite side thereof is referred to as a non-drive side, i.e., right side of FIG. 2. Arrow Z in the drawing denotes a direction from the non-drive side toward the drive side. An in-plane direction of a virtual plane orthogonal to the longitudinal direction, i.e., arrow Z, is also generally referred to as a short direction of the process cartridge B.

As illustrated in FIGS. 3 and 4, the process cartridge B is composed of a cleaning unit 10 serving as a first unit, i.e., photosensitive member unit, and a developing unit 15 serving as a second unit. The cleaning unit 10 includes the photosensitive drum 11 serving as an image bearing member. The developing unit 15 includes a developing roller 16 serving as a developing member that bears toner serving as a developer or as a developer bearing member.

The cleaning unit 10 includes the photosensitive drum 11, i.e., photosensitive drum assembly, a cleaning blade 17 serving as a cleaning member of the photosensitive drum 11, and a charging roller 12 serving as a charging member. Further, the cleaning unit 10 includes a charging roller cleaner 14 serving as a cleaning member of the charging roller 12, a waste toner primary storage portion 10*a*, a first waste toner conveyance path 10*b*, and a second waste toner conveyance path 10*c*.

The photosensitive drum 11 is formed by disposing a photosensitive layer formed for example of an organic photoconductor on an outer circumference side of a base formed in a cylindrical shape, or drum shape. The charging roller 12 is arranged to contact an outer circumference surface of the photosensitive drum 11. The charging roller 12 charges the photosensitive drum 11 by applying voltage from a high-voltage circuit board disposed in the printer body A. Further, the charging roller 12 is rotated by the rotation of the photosensitive drum 11, that is, rotated by following the rotation of the photosensitive drum 11.

The cleaning blade 17 is a member having elasticity arranged to contact the outer circumference surface of the photosensitive drum 11. A tip of the cleaning blade 17 is made to contact the photosensitive drum 11 elastically, removing waste toner as described later from the photosensitive drum 11. Waste toner removed by the cleaning blade 17 is conveyed from the waste toner primary storage portion 10*a* described below via the first waste toner conveyance path 10*b* and the second waste toner conveyance path 10*c* to the toner cartridge C.

As illustrated in FIG. 5, the developing unit 15 includes a developing chamber 151 in which the developing roller 16 is arranged, a developer storage chamber 152 for supplying toner to the developing chamber 151, and a receiving chamber 153 for receiving toner supplied from the toner cartridge C.

The developing roller 16 supplies toner to an image developing area of the photosensitive drum 11, that is, area of the photosensitive drum 11 facing the developing roller 16. The developing roller 16 develops an electrostatic latent image formed on the photosensitive drum 11 in the image developing area using toner. Further, a supplying roller 13 for supplying toner to the developing roller 16 is arranged in the developing chamber 151.

A developing blade 18 contacts a peripheral surface of the developing roller 16 and regulates an amount, or layer thickness, of toner adhered to the peripheral surface of the developing roller 16. Further, the developing blade 18 performs frictional charge by rubbing the toner adhered to the peripheral surface of the developing roller 16 and applies charge to toner particles.

An agitating member 154 is arranged in the developer storage chamber 152. Toner stored in the developer storage chamber 152 is transferred to the developing chamber 151 while being agitated by rotation of the agitating member 154, and supplied to the developing roller 16. The supplying roller 13 for supplying toner within the developing chamber 151 to the developing roller 16 can be arranged in the developing chamber 151.

The amount of toner within the developer storage chamber 152 is detected by a residual quantity detection unit not shown. A control unit of the printer body A executes an operation of supplying toner from the toner cartridge C to the process cartridge B in a case where the amount of toner within the developer storage chamber 152 drops to a certain amount or less based on a detection signal of the residual quantity detection unit.

The receiving chamber 153 is configured to receive toner from the toner cartridge C through a passage disposed in the cleaning unit 10. Actually, a replenishing port 21*c* for receiving toner from the toner cartridge C and a transfer port 21*d* for transferring toner to the receiving chamber 153 of the developing unit 15 are provided on a stay 21 constituting a part of the cleaning unit 10. Further, a screw 153*b* for conveying toner from the replenishing port 21*c* to the transfer port 21*d* is arranged in the receiving chamber 153.

Next, the operation of the printer 1 will be described with reference to FIG. 1. The printer 1 starts an image forming operation, for example, when an image information is received from an external apparatus. When the image forming operation is started, the photosensitive drum 11 is driven to rotate by a drive source of the printer body A, and a surface of the photosensitive drum 11 is charged uniformly to predetermined potential by the charging roller 12. Next, based on the image information, the laser scanner 101 exposes the surface of the photosensitive drum 11 being charged. Thereby, charge of the exposed portion is eliminated and an electrostatic latent image is formed on the surface of the photosensitive drum 11. By supplying toner to the electrostatic latent image from the developing roller 16, the electrostatic latent image is developed as a toner image. The toner image borne on the photosensitive drum 11 is conveyed to a transfer portion serving as a nip portion between the photosensitive drum 11 and the transfer roller 104.

Meanwhile, in parallel with the forming of toner images, the sheet feeding unit 103 conveys sheets S one at a time. Specifically, a feed roller 103*a* rotates and feeds the sheets S supported on the sheet feed tray one by one. Thereafter, at a matched timing with the reaching of the toner image to the transfer portion, the sheet S is conveyed to the transfer portion. Then, while the sheet S passes the transfer portion, the toner image is transferred from the photosensitive drum 11 to the sheet S by the transfer roller 104 having a transfer voltage applied thereto from the high-voltage circuit board. Toner remaining on the surface of the photosensitive drum 11 without being transferred to the sheet S from the photosensitive drum 11 at the transfer portion, i.e., waste toner, is removed from the surface of the photosensitive drum 11 by the cleaning blade 17.

The sheet S to which the toner image has been transferred is conveyed to the fixing unit 105. The fixing unit 105 adopts a heat fixing system, and the toner image on the sheet S is heated and pressed while the sheet S is nipped and conveyed by the nip portion of the rotary member pair. Thereby, an image fixed to the sheet S is obtained. In the case of simplex printing, the sheet S having passed through the fixing unit 105 is discharged to an exterior of the printer body A by a sheet discharge roller pair serving as a sheet discharge portion, and supported on a sheet discharge tray 106 disposed on an upper side of the printer body A. In the case of duplex printing, the sheet S having an image formed on a first surface by passing through the transfer portion and the fixing unit 105 is reversed by the sheet discharge roller pair also serving as a reverse portion, and conveyed again toward the transfer portion through a re-conveyance path. The sheet S to which an image has been formed on a second surface by passing through the transfer portion and the fixing unit 105 for the second time is discharged to the exterior of the printer body A by the sheet discharge roller pair and supported on the sheet discharge tray 106 disposed on the upper side of the printer body A.

Process Cartridge

Figure 9A:
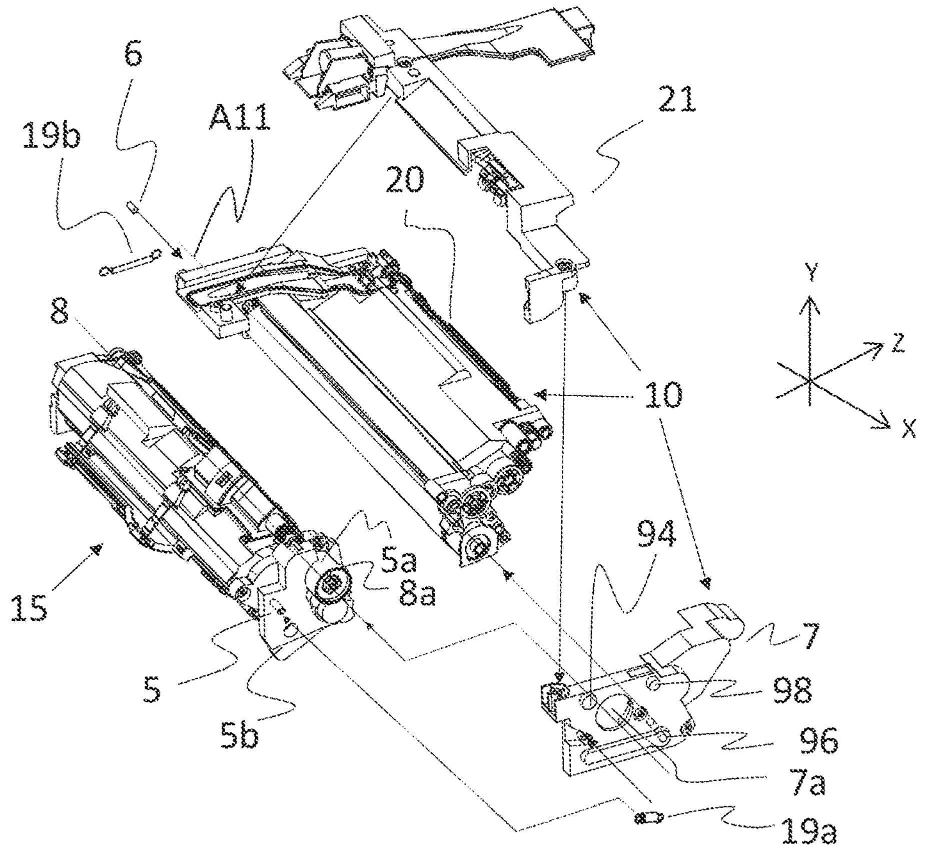
FIGS. 9A and 9B are each an exploded view of the process cartridge according to the embodiment.
Figure 9B:
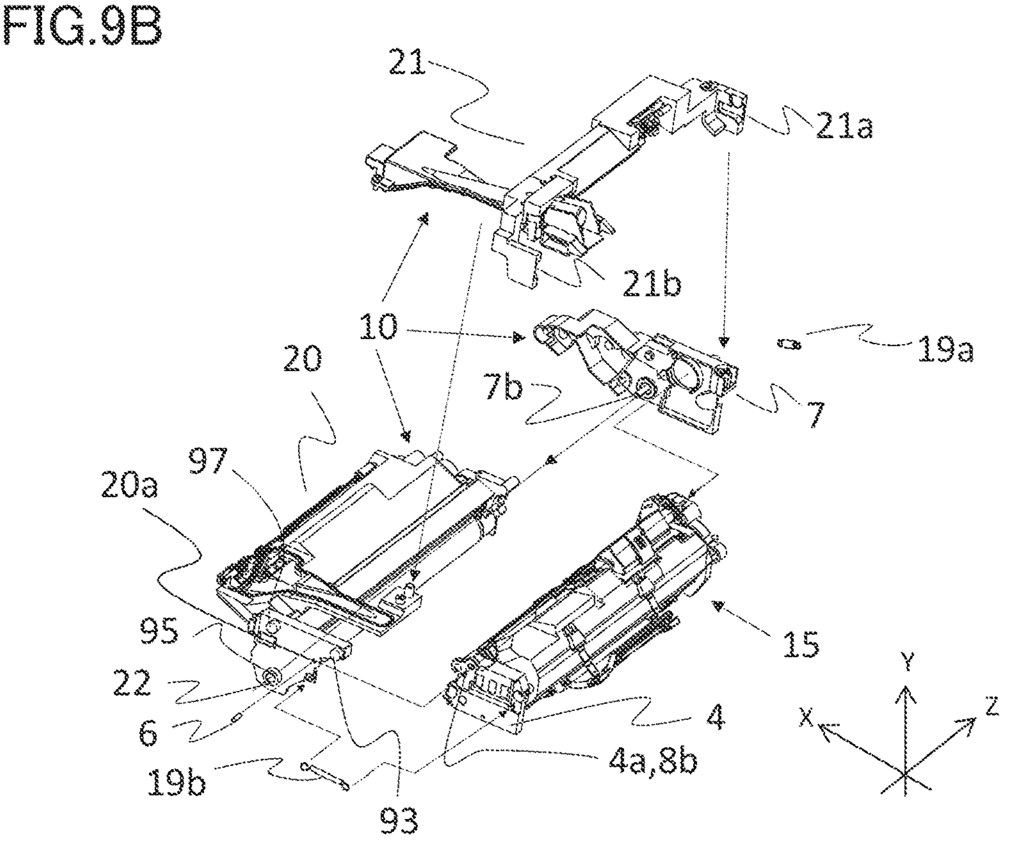
Figure 10A:
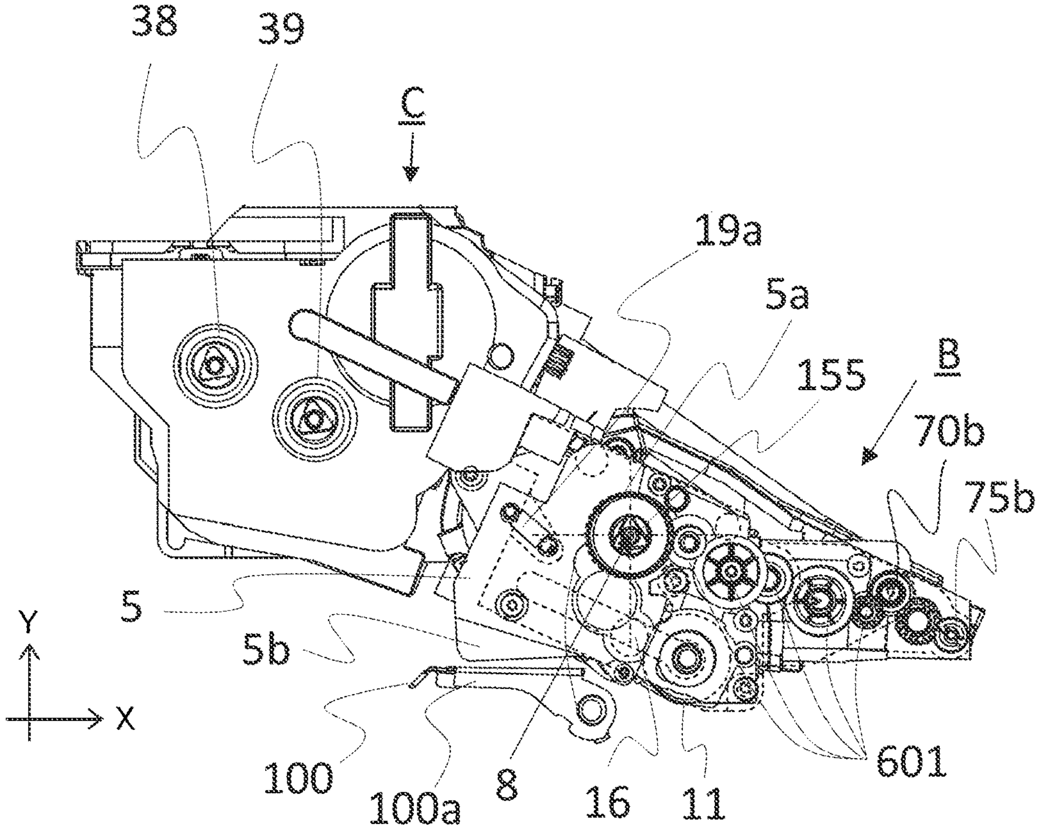
FIGS. 10A and 10B are each a side view illustrating an attachment of the process cartridge and the toner cartridge to the apparatus body according to the embodiment.
Figure 10B:
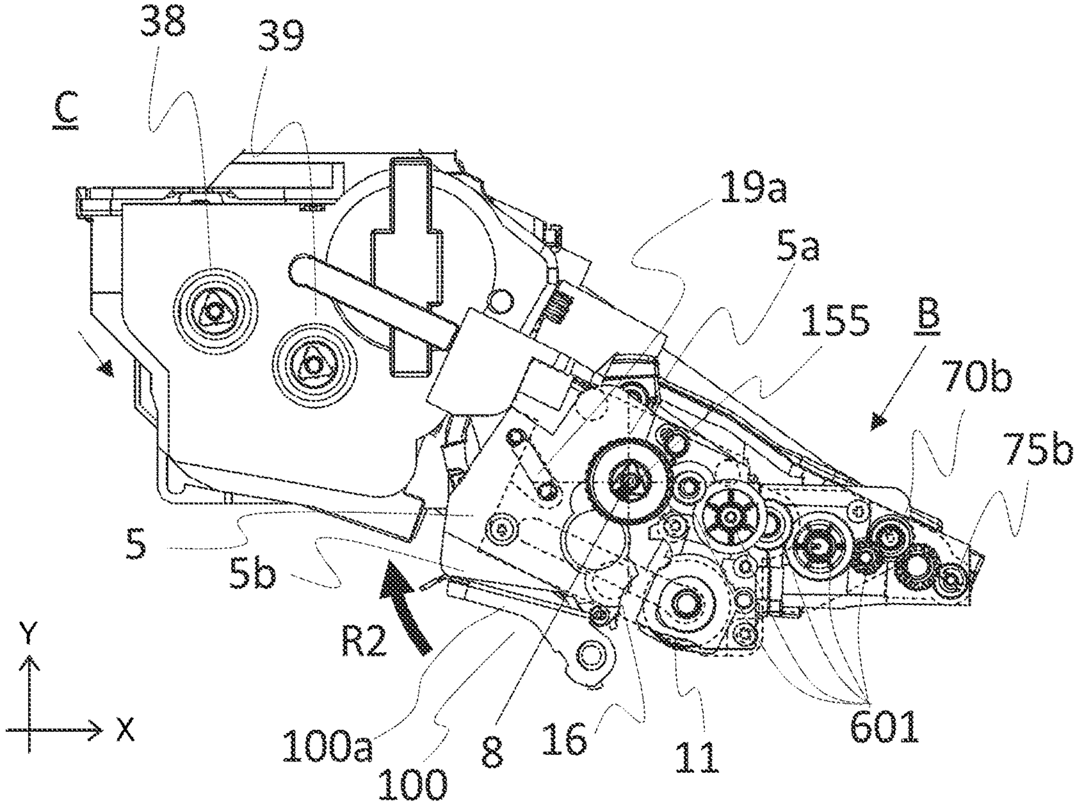

A configuration of the process cartridge B according to the present embodiment will be described in detail with reference to FIG. 3, FIGS. 9A and 9B, and FIGS. 10A and 10B. FIGS. 9A and 9B are each an exploded perspective view of the process cartridge B. FIG. 10A is a side view illustrating a developing-roller contact state of the process cartridge B. FIG. 10B is a side view illustrating a developing-roller separated state of the process cartridge B.

As illustrated in FIGS. 9A and 9B, bearing members 4 and 5 are arranged at respective end portions of the developing unit 15 in an axial direction of the developing roller 16. The developing unit 15 is connected to the cleaning unit 10 such that it is swingable, or pivotable, about a swing axis 8 defined by a straight line passing through support shafts 8*a* and 8*b* described below. The swing axis 8 is approximately parallel to a rotational axis A11 of the photosensitive drum 11.

A frame body of the cleaning unit 10 is composed of a main frame 20, the stay 21, and a side cover 7. The main frame 20 supports the cleaning blade 17, the charging roller 12, and the charging roller cleaner 14. The photosensitive drum 11 has one side thereof rotatably supported by a drum pin 22 mounted on the main frame 20 and an opposite side thereof rotatably supported by a photosensitive drum supporting portion 7*b* provided on the side cover 7.

The configuration in which the developing unit 15 is supported by the cleaning unit 10 will be described in detail below. As illustrated in FIG. 9A, a cylindrical portion 5*a* serving as a projecting portion provided on the bearing member 5 is supported by a cylindrical hole 7*a* serving as a recess portion provided on the side cover 7 of the cleaning unit 10. The support axis 8*a* is defined by a common axis of the cylindrical hole 7*a* of the side cover 7 and the cylindrical portion 5*a* of the bearing member 5. Further, as illustrated in FIG. 9B, a pin 6 is inserted in a manner extending across a cylindrical hole 20*a* of the main frame 20 of the cleaning unit 10 and a cylindrical hole 4*a* of the bearing member 4. The support axis 8*b* is defined by a common axis of the pin 6 and the cylindrical hole 4*a* of the bearing member 4. The support axis 8*a* and the support axis 8*b* are arranged approximately on a same axis, and as mentioned above, the swing axis 8 is defined by a straight line including the support axis 8*a* and the support axis 8*b*.

A protruded portion 5*b* serving as a portion to be pressed, hereinafter referred to as pressed portion, of the developing unit 15 described below is a part of the bearing member 5. That is, the cylindrical portion 5*a*, at which the developing unit 15 is swingably supported by the cleaning unit 10, is disposed on the same member, i.e., the bearing member 5, as the protruded portion 5*b*. In other words, the portion at which the second unit is swingably supported by the first unit is disposed on the same member as the pressed portion. According to this configuration, the positional accuracy of the protruded portion 5*b* and the cylindrical portion 5*a* can be improved and the developing roller 16 can be moved highly accurately by being pressed by the protruded portion 5*b*. Alternatively, it is possible to provide a cylindrical portion serving as a projecting portion instead of the cylindrical hole 7*a* on the side cover 7 and to provide a cylindrical hole serving as a recess portion for fitting the cylindrical portion on the bearing member 5.

The developing unit 15 is movable about the swing axis 8 between a contact position in which the developing roller 16 contacts the photosensitive drum 11 and a separated position in which the developing roller 16 is separated from the photosensitive drum 11. Hereafter, a state of the process cartridge B in which the developing unit 15 is at a contact position is referred to as a "developing-roller contact state" and a state of the process cartridge B in which the developing unit 15 is at a separated position is referred to as a "developing-roller separated state".

The process cartridge B includes pressurizing springs 19*a* and 19*b* serving as urging members for urging the developing unit 15. The pressurizing springs 19*a* and 19*b* are elastic members that connect the developing unit 15 and the cleaning unit 10, and tension springs are used in the illustrated configuration. The developing unit 15 is urged toward the contact position by the pressurizing springs 19*a* and 19*b*.

Further, the printer body A includes a separation mechanism 100 described below as an actuator for moving the developing unit 15 to the contact position and to the separated position. A separation lever 100*a* serving as a pressing member is movable between a position where the developing unit 15 is retained at the contact position and a position where the developing unit 15 is allowed to move from the contact position to the separated position. That is, the separation mechanism 100 can move the developing unit 15 from the contact position to the separated position against the urging force of the pressurizing springs 19*a* and 19*b*.

Figure 17:
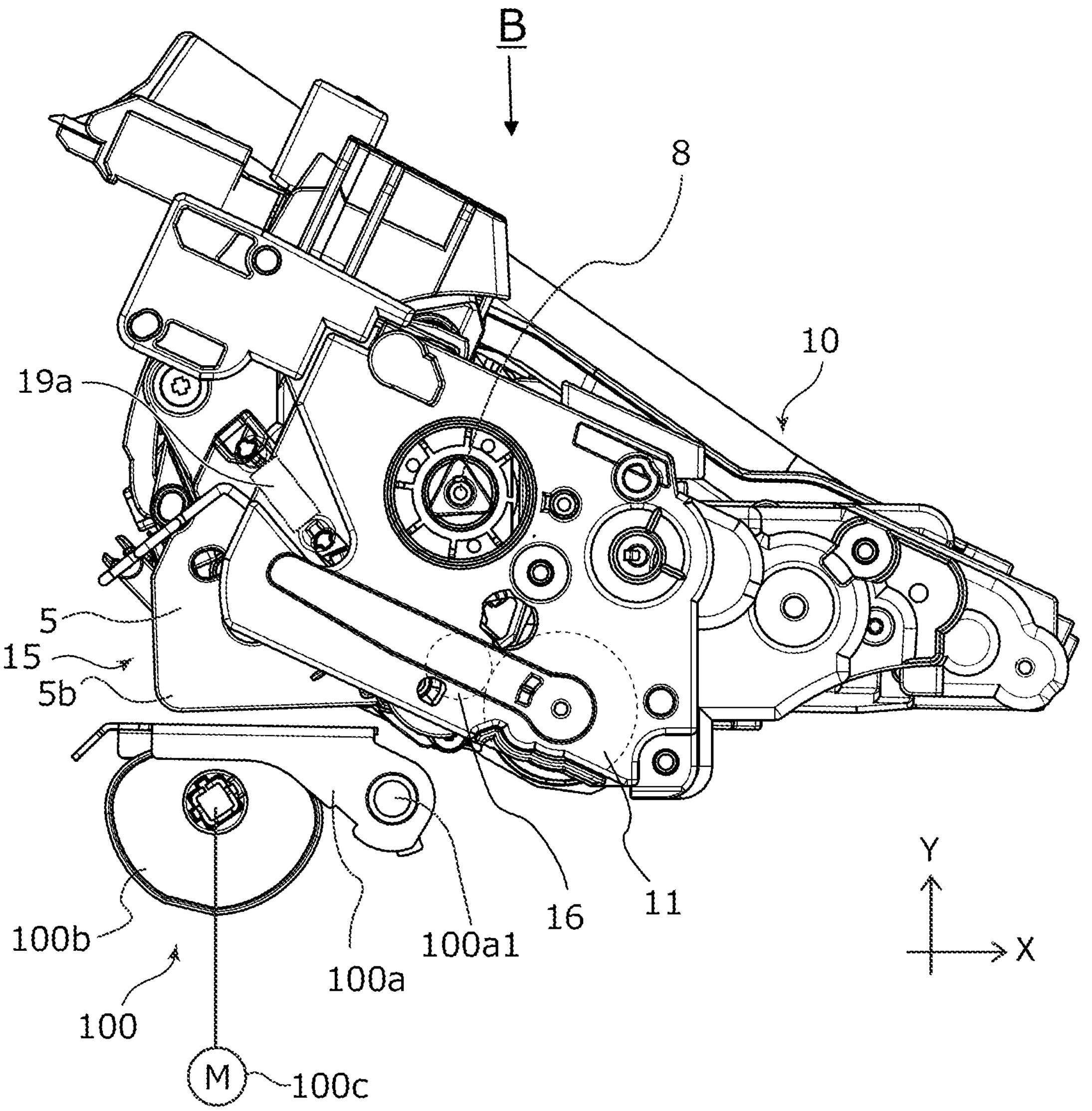
FIG. 17 is a side view illustrating a developing-roller contact state of the process cartridge according to the embodiment.
Figure 18:
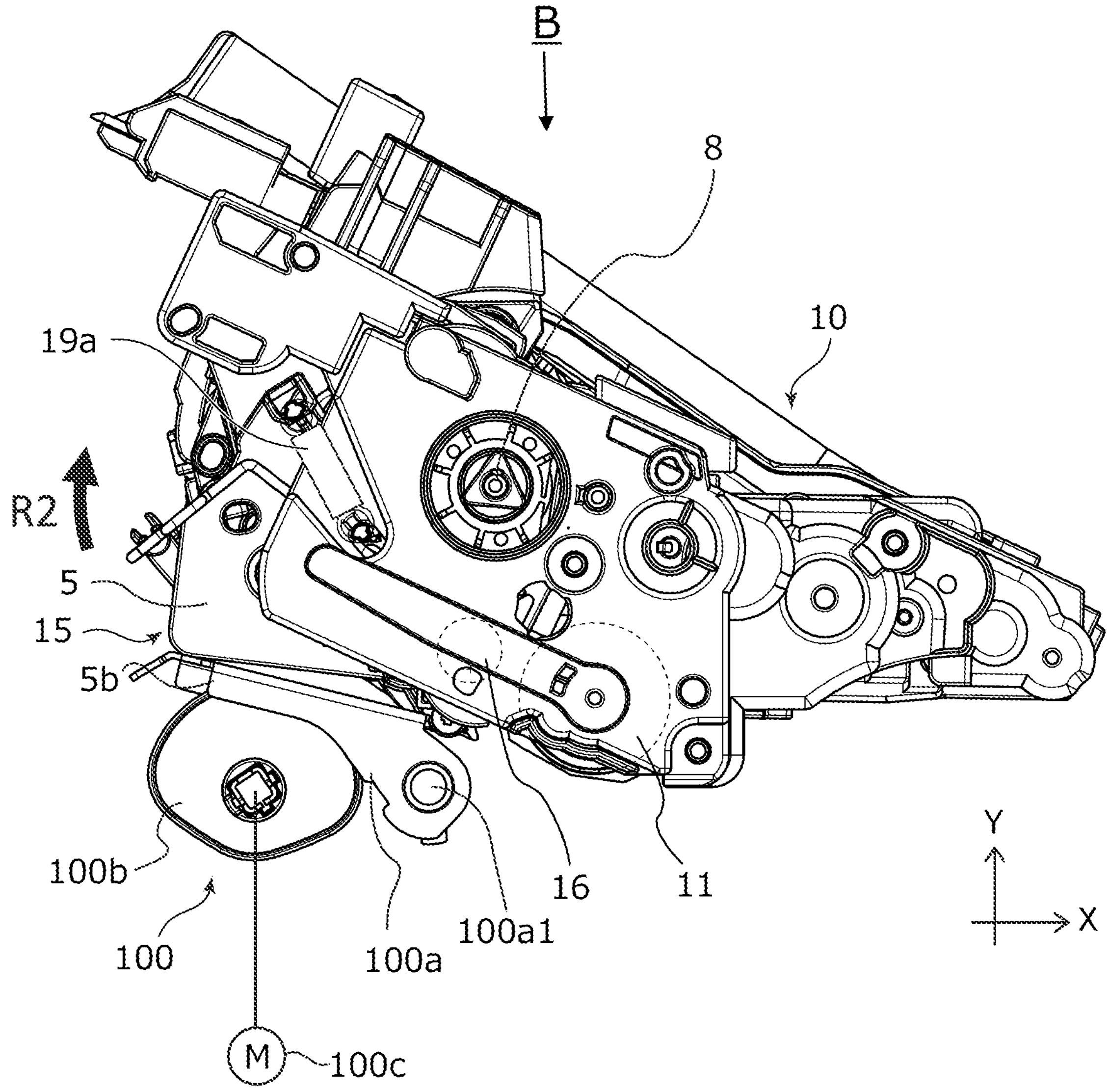
FIG. 18 is a side view illustrating the developing-roller separated state of the process cartridge according to the embodiment.

An operation in which the developing unit 15 moves between the contact position and the separated position will be described with reference to FIGS. 10A and 10B, FIG. 17, and FIG. 18. FIG. 10A is a side view illustrating the process cartridge B in the developing-roller contact state, and FIG. 17 is a detailed view thereof. FIG. 10B is a side view illustrating the process cartridge B in the developing-roller separated state, and FIG. 18 is a detailed view thereof. In order to illustrate the separation mechanism 100 of the printer body A, the side cover 7 of the cleaning unit 10 is omitted from FIGS. 10A and 10B.

As illustrated in FIGS. 10A and 10B, FIG. 17, and FIG. 18, the protruded portion 5*b* is disposed on the bearing member 5 of the developing unit 15. The protruded portion 5*b* is a portion, i.e., pressed portion, that is pressed by the separation lever 100*a* provided on the separation mechanism 100.

The separation mechanism 100 of the printer body A includes the separation lever 100*a* serving as a pressing member, a separation cam 100*b* for moving the separation lever 100*a*, and a motor 100*c* for driving the separation cam 100*b* to rotate. The separation lever 100*a* is disposed pivotably about an axis 100*a*1 that is approximately parallel to the rotational axis of the developing roller 16. Each time the motor 100*c* rotates the separation cam 100*b* for a predetermined amount, such as 180 degrees, based on a command from a control unit of the printer body A, the position of the separation lever 100*a* is switched between a position for pressing the protruded portion 5*b* and a position retreated from the protruded portion 5*b*.

As illustrated in FIG. 10A and FIG. 17, in a state where the separation lever 100*a* is at the position retreated from the protruded portion 5*b*, the developing unit 15 is retained at the contact position and the developing roller 16 is in contact with the photosensitive drum 11 by the urging force of the pressurizing springs 19*a* and 19*b*. In this state, the developing roller 16 can develop the electrostatic latent image formed on the surface of the photosensitive drum 11. That is, the developing-roller contact state is a state in which the formation of image can be executed using the process cartridge B. Further, the contact position of the developing unit 15 is a position of the developing unit 15, in other words during an image-forming period, a position at which the developing unit 15 can execute the image developing process appropriately using the developer bearing member.

As illustrated in FIG. 10B and FIG. 18, the separation lever 100*a* contacts the protruded portion 5*b* by being pressed by the separation cam 100*b* and pivoting, and pivots the developing unit 15 in the direction of arrow R2 against the urging force of the pressurizing springs 19*a* and 19*b*. That is, the developing unit 15 pivots in the direction toward the separated position from the contact position, that is, R2 direction, with the swing axis 8 serving as the pivot axis by the force that the protruded portion 5*b* receives from the separation lever 100*a*. Thereby, the developing unit 15 moves to the separated position and the developing roller 16 separates from the photosensitive drum 11.

The developing-roller separated state is a state in which the process cartridge B does not execute the image forming operation, that is, a state in a non-image-forming period. Further, the separated position of the developing unit 15 is the position of the developing unit 15 during the non-image-forming period, in other words, a position in which the developing unit 15 is in a state where the developer bearing member is positioned farther from the image bearing member compared to the position where the image forming process can be performed by the developer bearing member. The control unit of the printer body A controls the motor 100*c* to set the process cartridge B to the developing-roller separated state during the non-image-forming period, i.e., a period in which image formation is not performed, such as a period after the completion of an image forming job and before entry of a subsequent job.

When the separation lever 100*a* returns to an original position (FIGS. 10A and 17), the separation lever 100*a* is separated from the protruded portion 5*b*. Thereby, the developing unit 15 moves from the separated position to the contact position by the urging force of the pressurizing springs 19*a* and 19*b*. That is, as illustrated in FIG. 10A, the developing roller 16 and the photosensitive drum 11 contact each other again.

As described, a configuration is adopted in which the separation mechanism 100 can switch the process cartridge B between the developing-roller contact state and the developing-roller separated state. Therefore, for example, by setting the process cartridge B to be in the developing-roller separated state during the non-image-forming period, deterioration of toner and the photosensitive drum 11 can be suppressed and unnecessary toner consumption during the non-image-forming period can be suppressed.

General Configuration of Toner Cartridge

Figure 7:
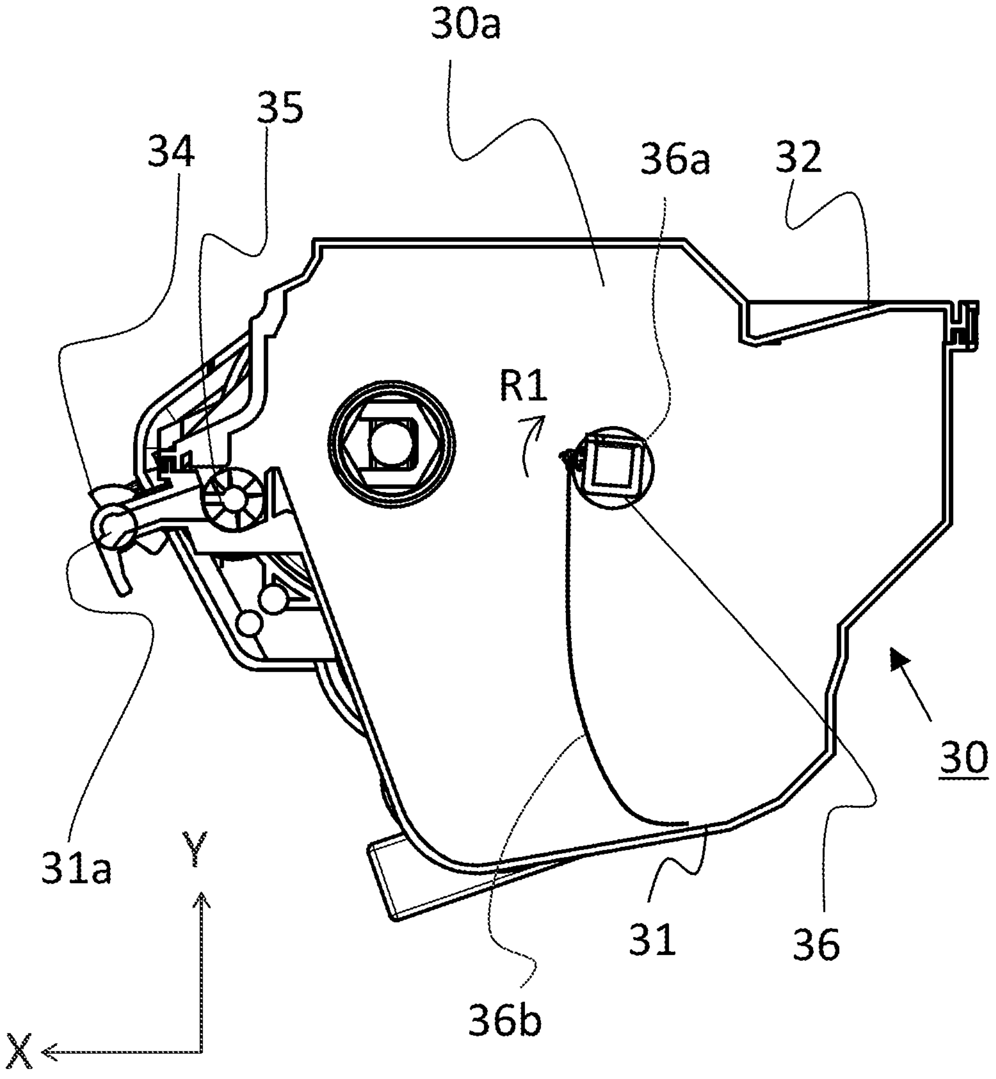
FIG. 7 is a cross-sectional view of the toner cartridge according to the embodiment.
Figure 8:
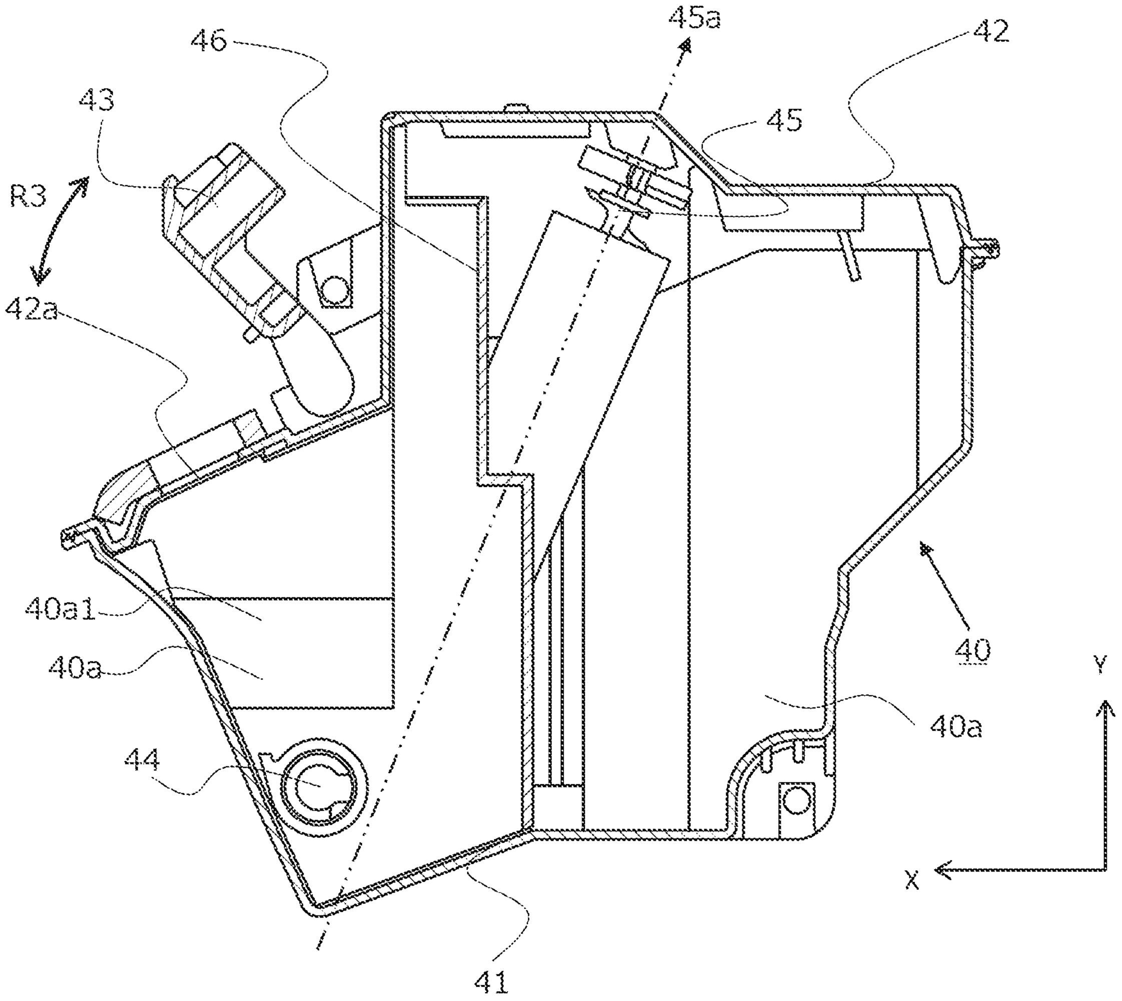
FIG. 8 is a cross-sectional view of the toner cartridge according to the embodiment.
Figure 13A:
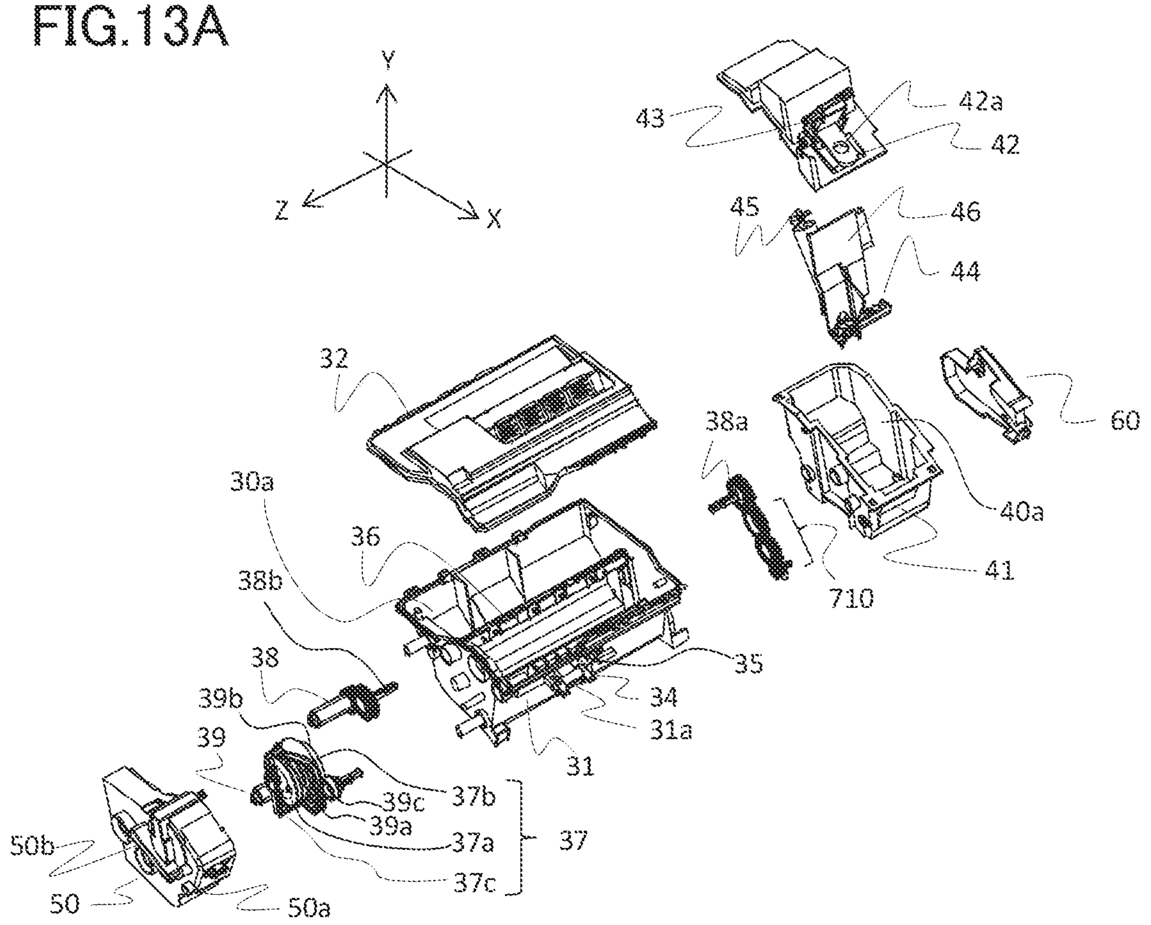
FIGS. 13A and 13B are each an exploded view of the toner cartridge according to the embodiment.
Figure 13B:
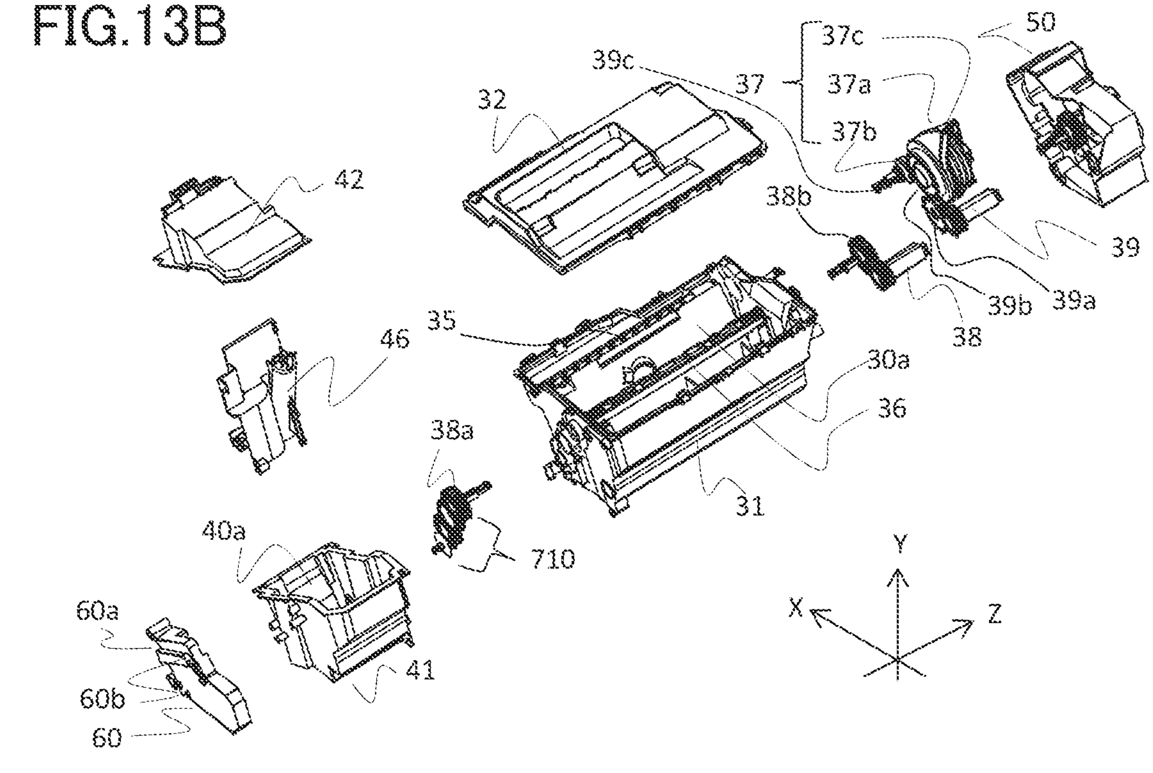

The toner cartridge C will be described with reference to FIGS. 6, 7 and 8, and FIGS. 13A and 13B. FIG. 6 is a front view of the toner cartridge C, that is, the toner cartridge C is viewed from the left side of FIG. 1. FIG. 7 is a cross-sectional view illustrating a toner supply portion 30 of the toner cartridge C, i.e., a-a cross section of FIG. 6. FIG. 8 is a cross-sectional view illustrating a waste toner collecting portion 40 of the toner cartridge C, i.e., b-b cross-section of FIG. 6. FIGS. 13A and 13B are each an exploded view of the toner cartridge C.

Figure 6:
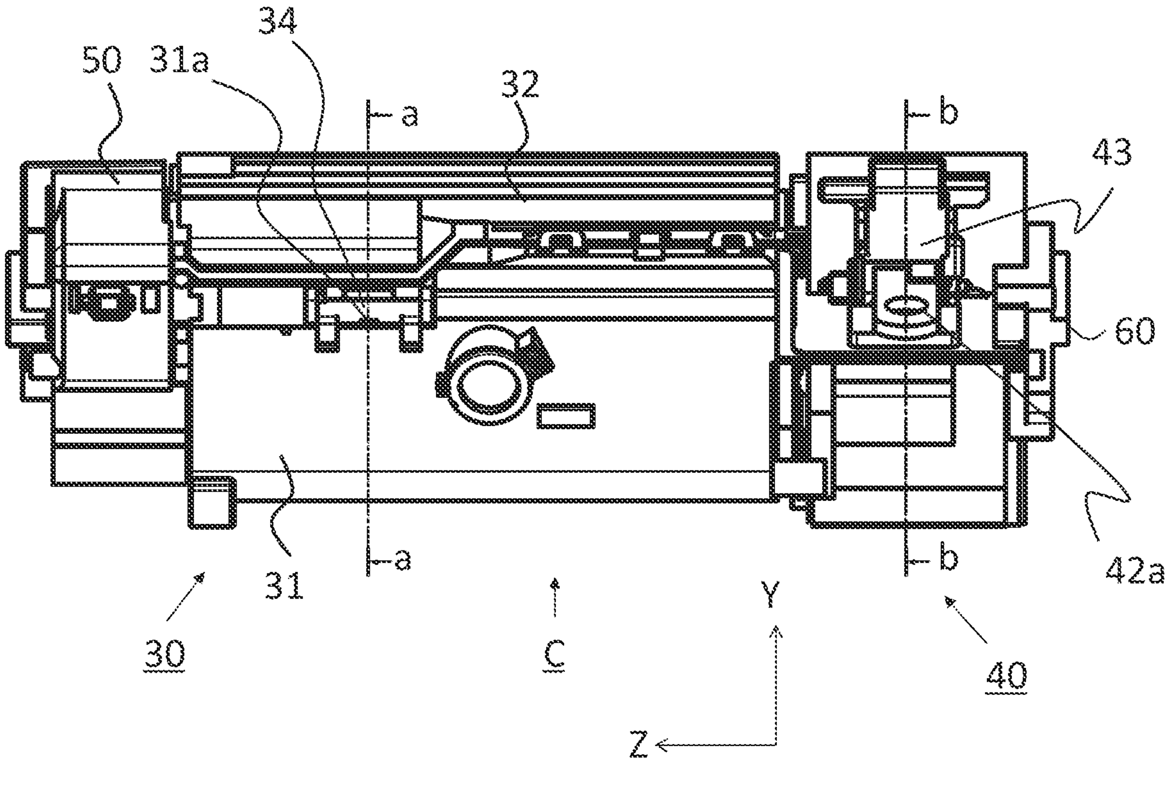
FIG. 6 is a front view of a toner cartridge according to the embodiment.

As illustrated in FIG. 6, the toner cartridge C has an outer shape that is extended in a predetermined longitudinal direction. The direction from one end side toward the other end side of the toner cartridge C along the longitudinal direction of the toner cartridge C is denoted by arrow Z in FIG. 6. The longitudinal direction of the toner cartridge C is approximately parallel to the rotational axis direction of the photosensitive drum 11 and the rotational axis direction of the developing roller 16 in a state where the toner cartridge C and the process cartridge B are attached to the printer body A. That is, the longitudinal direction of the toner cartridge C is approximately parallel to the longitudinal direction of the process cartridge B. Hereafter, the longitudinal direction of the toner cartridge C and the longitudinal direction of the process cartridge B are not distinguished, and both are simply referred to as "longitudinal direction".

The directions of arrows X, Y, and Z illustrated in FIG. 6 are the same as those referred to in the description of the process cartridge B (such as FIG. 2).

One end side of the toner cartridge C in the longitudinal direction from which side the driving force is mainly entered to the toner cartridge C from the printer body A is referred to as a drive side, i.e., left side of FIG. 6, and an opposite side thereof is referred to as a non-drive side, i.e., right side of FIG. 6. In the present embodiment, the drive side refers to a side on which the toner supply portion 30 is arranged with respect to the waste toner collecting portion 40 described below, and the non-drive side refers to a side on which the waste toner collecting portion 40 is arranged with respect to the toner supply portion 30. Further, an in-plane direction of a virtual plane orthogonal to the longitudinal direction (arrow Z) is also generally referred to as a short direction of the toner cartridge C.

Toner Supply Portion

As illustrated in FIG. 6, the toner cartridge C includes the toner supply portion 30 for supplying toner to the process cartridge B, the waste toner collecting portion 40 for collecting waste toner from the process cartridge B, and a pump unit 37. The pump unit 37 (FIG. 13A) is arranged on an inner side of a drive-side cover 50 of the toner cartridge C.

The toner supply portion 30 is equipped with a toner storage portion 30*a* for storing toner, as illustrated in FIGS. 6, 7, 13A, and 13B. The toner storage portion 30*a* is formed of a supply portion frame body 31 and a supply portion lid 32. The supply portion frame body 31 includes a toner discharge port 31*a* for discharging toner within the toner storage portion toward the developing unit 15. The toner discharge port 31*a* is arranged to face the replenishing port 21*c* (FIG. 5) of the process cartridge B in a state where the toner cartridge C is mounted to the printer body A. Replenishing of toner to the process cartridge B is enabled by communicating the toner discharge port 31*a* and the replenishing port 21*c*. A shutter member 34 that opens the toner discharge port 31*a*, that is in a closed state, in linkage with the attachment of the toner cartridge C to the printer body A is disposed on an outer side of the supply portion frame body 31.

The toner storage portion 30*a* includes a replenishing screw 35 serving as a screw member for conveying toner toward the toner discharge port 31*a*, and an agitating conveyance unit 36 serving as an agitating conveyance member for conveying toner toward the replenishing screw 35 while agitating toner.

The replenishing screw 35 and the agitating conveyance unit 36 each convey and agitate toner by rotating about a rotational axis extending in the longitudinal direction. That is, the replenishing screw 35 and the agitating conveyance unit 36 are each an example of a toner conveyance unit for conveying toner. The agitating conveyance unit 36 includes a shaft portion 36*a* that rotates by receiving transmission of driving force, and an agitating portion 36*b* that protrudes radially from the shaft portion 36*a* and that rotates together with the shaft portion 36*a* to convey and agitate toner. The shaft portion 36*a* extends in the longitudinal direction so as to pass through the toner storage portion 30*a*. The agitating portion 36*b* is formed of a resin sheet having flexibility, for example. Toner conveyed by the agitating conveyance unit 36 and the replenishing screw 35 to the toner discharge port 31*a* is discharged through the toner discharge port 31*a* by the pump unit 37.

As illustrated in FIGS. 13A and 13B, the pump unit 37 includes a pump 37*a* that is configured to expand and contract in the longitudinal direction of the toner cartridge C to change an internal volume thereof, and a cam 37*b* that is rotatably arranged coaxially with the pump 37*a*. Further, the pump unit 37 includes a link arm 37*c* that expands and contracts the pump 37*a* in the longitudinal direction by rectilinear motion in the longitudinal direction accompanying the rotation of the cam 37*b*.

The pump 37*a* has a cylindrical outer shape, and a side portion of the cylindrical shape is formed in the shape of a bellows. Therefore, the pump 37*a* can expand and contract in a direction along the central axis of the cylindrical shape. The cam 37*b* and the link arm 37*c* constitute a cam mechanism for converting a rotational driving force entered to the toner cartridge C to a rectilinear motion in the contracting direction of the pump 37*a* and the expanding direction opposite thereto to thereby drive the pump 37*a*.

Drive Configuration of Toner Supply Portion

A drive configuration of the toner supply portion 30 will be described with reference to FIG. 7 and FIGS. 13A and 13B. As illustrated in FIGS. 13A and 13B, the toner supply portion includes a first drive input portion 38 (agitating-conveyance-unit drive input portion) for driving the agitating conveyance unit 36, and a second drive input portion 39 (pump/screw drive input portion) for driving the pump unit 37 and the replenishing screw 35. The first drive input portion 38 and the second drive input portion 39 are each arranged on one side, i.e., drive side, in the longitudinal direction of the toner cartridge C.

Since the first drive input portion 38 and the second drive input portion 39 are disposed independently on the toner cartridge C, the agitating conveyance unit 36 can be controlled to be driven independently with respect to the pump unit 37 and the replenishing screw Specifically, the agitating conveyance unit 36 is driven continuously during the image-forming period, while the pump unit 37 and the replenishing screw 35 are driven intermittently only at timings at which replenishing of toner to the process cartridge B is required. The timing at which replenishing of toner is required is determined by the control unit of the printer body A based on the detection signal of the residual quantity detection unit described above.

An agitating drive side gear 38*b* for transmitting rotational driving force to the agitating conveyance unit 36 is arranged adjacent to the first drive input portion 38 when viewed in the longitudinal direction. The agitating drive side gear 38*b* is arranged on one end side in the longitudinal direction of the agitating conveyance unit 36 and coaxially therewith, and is rotated integrally with the agitating conveyance unit 36. The agitating drive side gear 38*b* receives driving force from the first drive input portion 38 and rotates the agitating conveyance unit 36 in an R1 direction in FIG. 7. By rotating the agitating conveyance unit 36 in the R1 direction, toner within the toner storage portion 30*a* is conveyed toward the replenishing screw 35.

A cam drive gear 39*a* that rotates by receiving driving force from the second drive input portion 39 is disposed next to the second drive input portion 39 when viewed in the longitudinal direction. A cam gear 39*b* that rotate s b y receiving driving force from the cam drive gear 39*a* is disposed next to the cam drive gear 39*a*. The cam gear 39*b* is formed integrally with the cam 37*b*. Therefore, the cam 37*b* of the pump unit 37 rotates by rotating the cam gear 39*b* accompanying the rotation of the second drive input portion 39. Then, by the rotation of the cam 37*b*, the link arm 37*c* performs rectilinear motion in the longitudinal direction, and the pump 37*a* expands and contracts.

A screw drive gear 39*c* that transmits rotational driving force to the replenishing screw 35 is disposed adjacent to the cam gear 39*b* when viewed in the longitudinal direction. The screw drive gear 39*c* is disposed coaxially with the replenishing screw 35 on one longitudinal end side thereof, and rotates integrally with the replenishing screw 35. The screw drive gear 39*c* receives driving force from the cam gear 39*b* and rotates the replenishing screw 35. By the rotation of the replenishing screw 35, toner within the toner storage portion 30*a* is conveyed toward the toner discharge port 31*a* in the longitudinal direction.

As illustrated in FIGS. 6, 13A and 13B, the drive-side cover 50 is disposed on the drive side end of the toner cartridge C. The drive-side cover 50 is fixed to the toner storage portion 30*a*, i.e., the supply portion frame body 31. The drive-side cover 50 is a part of the frame body of the toner cartridge C. The drive-side cover 50 rotatably b ears the first drive input portion 38 and the second drive input portion 39.

Further, a positioning boss 50*a* and a guided portion 50*b* are disposed on the drive-side cover 50. These members have a function to regulate the position of the toner cartridge C when attaching the toner cartridge C to the printer body A, as described below.

Waste Toner Collecting Portion

Next, a general configuration of the waste toner collecting portion 40 will be described. As illustrated in FIG. 8, the waste toner collecting portion 40 includes a waste toner storage portion 40*a* that stores waste toner. The waste toner storage portion 40*a* is formed of a storage portion frame body 41 and a storage portion lid 42. A waste toner inlet 42*a* for receiving waste toner collected from the process cartridge B is disposed on the storage portion lid 42. The waste toner collecting portion 40 includes a shutter member 43 that opens and closes the waste toner inlet 42*a*. The shutter member 43 is opened and closed in a direction of arrow R3 in linkage with the attachment and detachment of the toner cartridge C to and from the printer body A.

As illustrated in FIGS. 13A and 13B, a partition member 46, and a first waste toner screw 44 and a second waste toner screw 45 that serve as a waste toner conveyance unit for conveying the waste toner within the waste toner storage portion 40*a* are arranged inside the waste toner storage portion 40*a*. The first waste toner screw 44 conveys the waste toner falling in through the waste toner inlet 42*a* to the longitudinal direction of the toner cartridge C. The second waste toner screw 45 acquires driving force from the first waste toner screw 44 and conveys the waste toner that has been conveyed from the first waste toner screw 44 obliquely upward.

The waste toner collecting portion 40 receives drive transmission as described below. As illustrated in FIGS. 13A and 13B, an agitating non-drive side gear 38*a* is disposed on an opposite side in the agitating conveyance unit 36 from the aforementioned agitating drive side gear 38*b* in the longitudinal direction. The driving force entered to the aforementioned first drive input portion 38 at the drive side of the toner supply portion 30 is transmitted via the agitating conveyance unit 36 to the non-drive side of the toner supply portion 30 and transmitted to the agitating non-drive side gear 38*a*.

A gear train 710 for transmitting drive to the first waste toner screw 44 within the waste toner storage portion 40*a* is disposed adjacent to the agitating non-drive side gear 38*a* when viewed in the longitudinal direction. That is, the first waste toner screw 44 rotates by receiving rotational driving force from the printer body A via the first drive input portion 38, the agitating drive side gear 38*b*, the agitating conveyance unit 36, the agitating non-drive side gear 38*a*, and the gear train 710.

As illustrated in FIG. 6 and FIGS. 13A and 13B, the non-drive-side cover 60 is disposed on an end portion on the non-drive side, that is, on the side of the waste toner collecting portion 40, of the toner cartridge C. The non-drive-side cover 60 is fixed to the waste toner storage portion 40*a*, i.e., the storage portion frame body 41. The non-drive-side cover 60 is a part of the frame body of the toner cartridge C.

A positioning boss 60*a* and a guided portion 60*b* are disposed on the non-drive-side cover 60. As descried below, these members have a function to regulate the position of the toner cartridge C when attaching the toner cartridge C to the printer body A.

Method for Attaching and Detaching Process Cartridge and Toner Cartridge

Figure 11A:
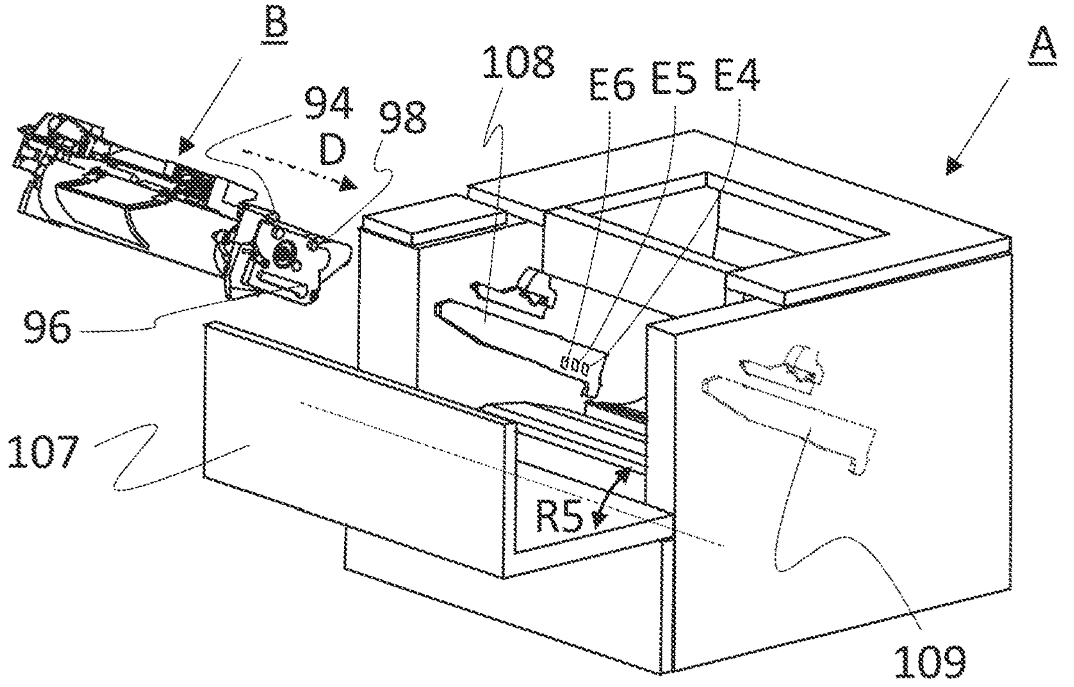
FIGS. 11A and 11B are each a perspective view illustrating the attachment of the process cartridge and the toner cartridge to the apparatus body according to the embodiment.
Figure 11B:
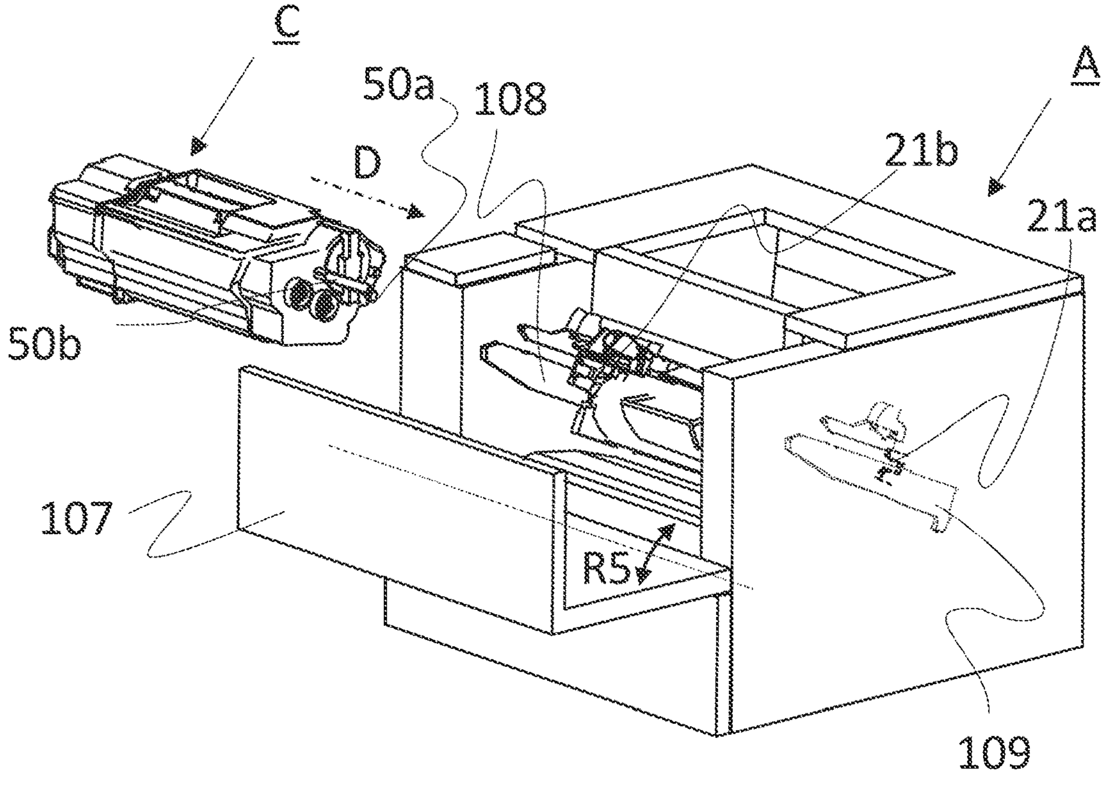
Figure 12A:
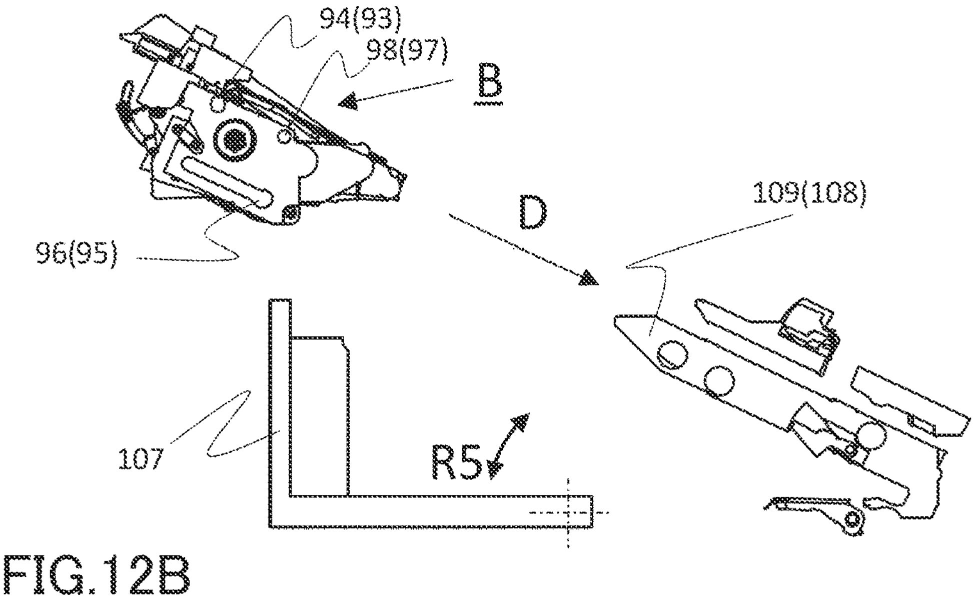
FIGS. 12A, 12B, and 12C are each a schematic drawing illustrating the attachment of the process cartridge and the toner cartridge to the apparatus body according to the embodiment.
Figure 12B:
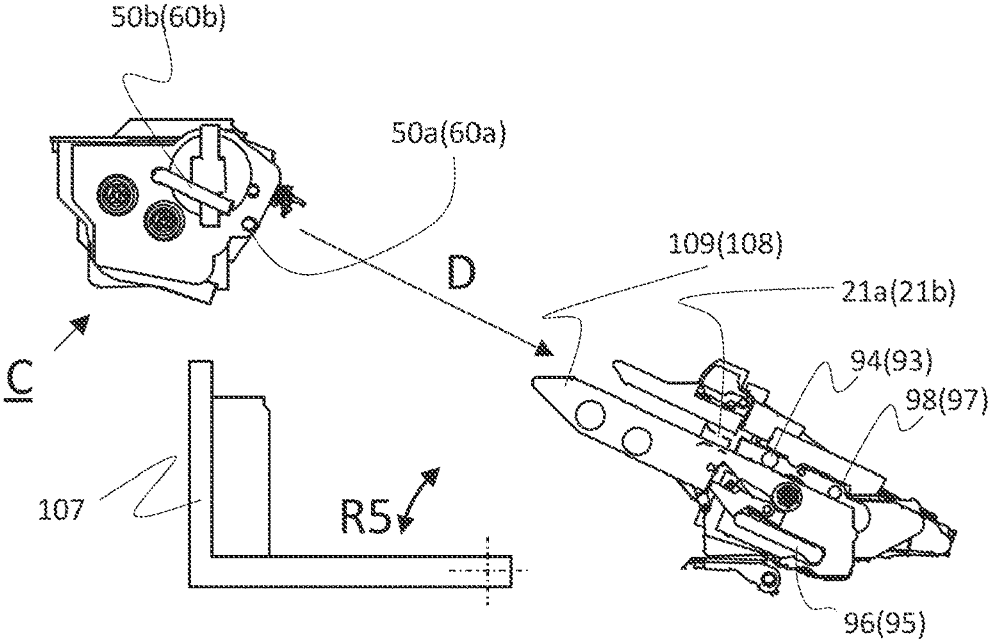
Figure 12C:
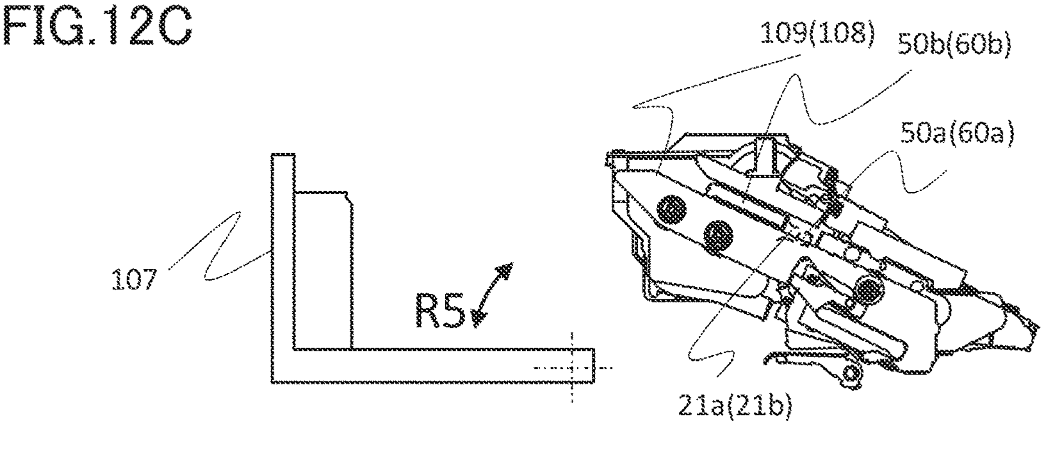
Figure 16A:
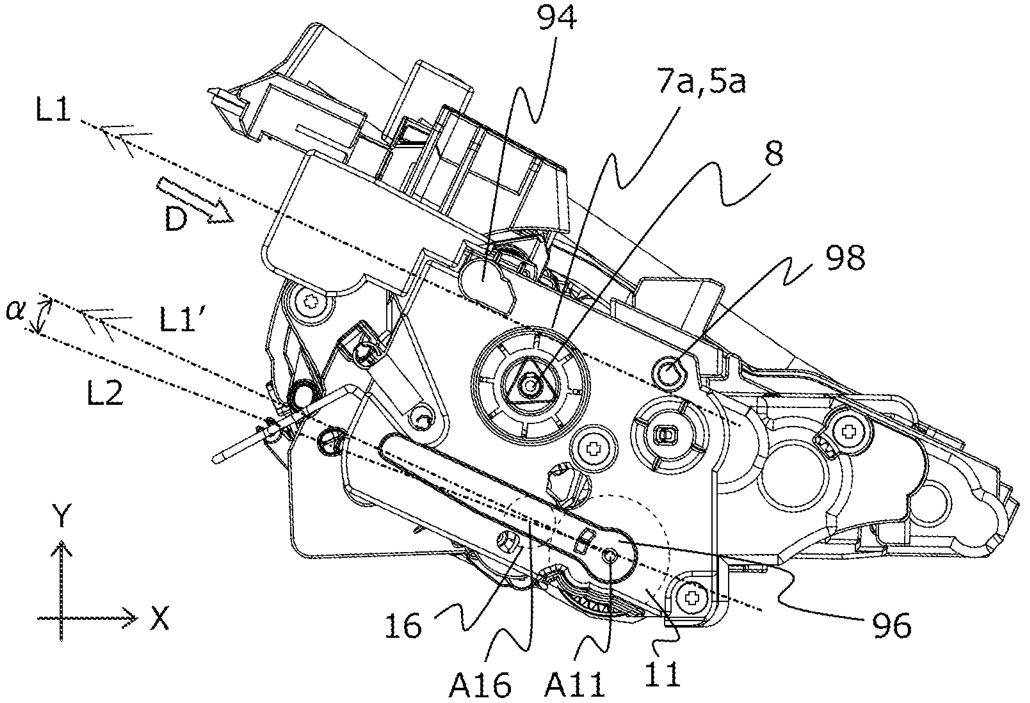
FIGS. 16A and 16B are each a side view of the process cartridge according to the embodiment.
Figure 16B:
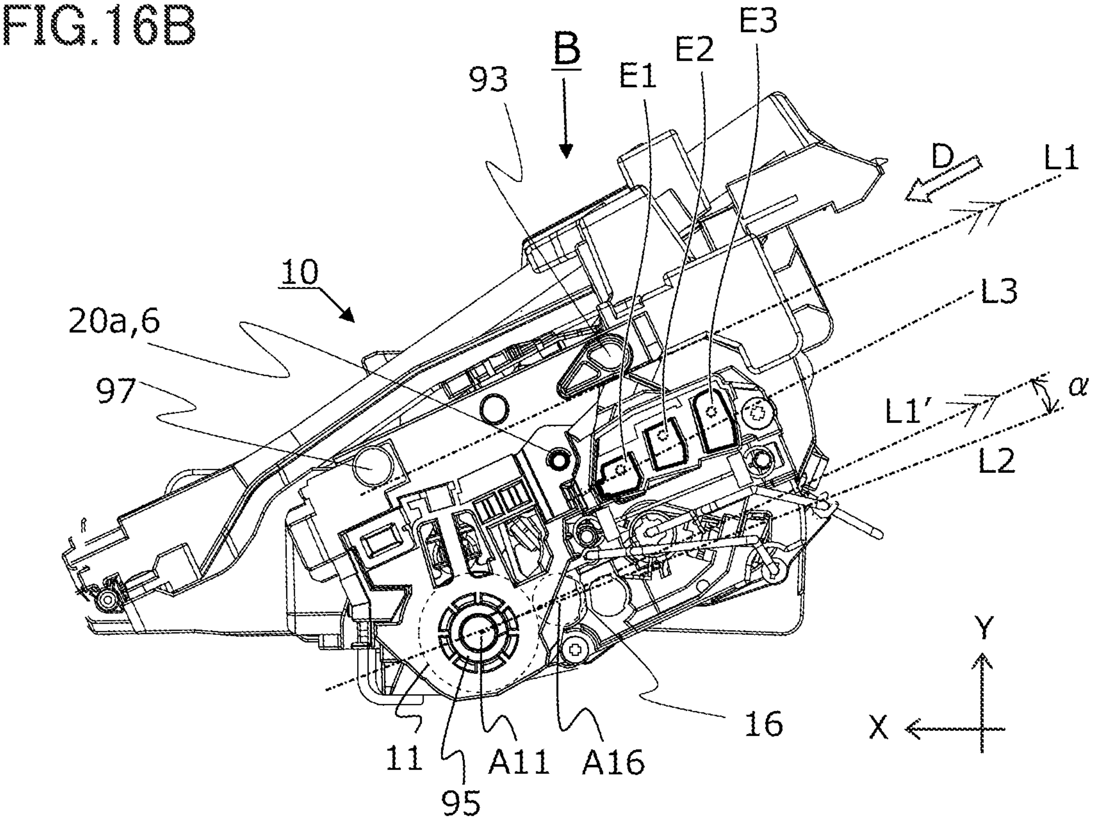

Next, a method for attaching and detaching the process cartridge B and the toner cartridge C to the printer body A will be described with reference to FIGS. 11A and 11B, FIGS. 12A to 12C, and FIGS. 16A and 16B. FIGS. 11A and 11B are each a perspective view for describing the attaching of the process cartridge B and the toner cartridge C to the printer body A. FIGS. 12A to 12C are each a side view for describing the attachment of the process cartridge B and the toner cartridge C to the printer body A. FIG. 16A is a side view illustrating the process cartridge B from the drive side in the longitudinal direction. FIG. 16B is a side view illustrating the process cartridge B from the non-drive side in the longitudinal direction.

As illustrated in FIG. 11A, an attachment portion, which is a space for attaching the process cartridge B and the toner cartridge C, is provided inside the printer body A. A door 107 that is pivotable, i.e., openable and closable, about a pivot axis R5 with respect to the printer body A is disposed on an outer side of the printer body A. FIGS. 11A and 11B each illustrate a state in which the door 107 is opened. By opening the door 107, the attachment portion of the interior of the printer body A is exposed to an outer side of the printer body A. Further, the printer body A includes guide portions 108 and 109.

As illustrated in FIGS. 16A and 16B, upper bosses 93 and 94, lower bosses 95 and 96, and tip bosses 97 and 98 are provided on both end portions of the process cartridge B in the longitudinal direction (refer also to FIGS. 9A and 9B). Specifically, the upper boss 94, the lower boss 96 disposed lower than the upper boss 94, and the tip boss 98 disposed downstream of the upper boss 94 in an attaching direction D are arranged on a side face portion on the drive side of the process cartridge B (FIG. 16A). The upper boss 93, the lower boss 95 disposed lower than the upper boss 93, and the tip boss 97 disposed downstream of the upper boss 93 in the attaching direction D are arranged on a side face portion on the non-drive side of the process cartridge B (FIG. 16B). The upper bosses 93 and 94 function as first guided portions to be guided by the guide portions 108 and 109 of the printer body A. The tip bosses 97 and 98 function as second guided portions to be guided by the guide portions 108 and 109 of the printer body A. Further, the stay 21 of the process cartridge B includes toner cartridge positioning portions 21*a* and 21*b* (FIG. 9B).

The positioning bosses 50*a* and 60*a* and the guided portions 50*b* and 60*b* are disposed on the toner cartridge C, as illustrated in FIGS. 13A and 13B. The positioning bosses 50*a* and 60*a* are disposed on both ends in the longitudinal direction of the toner cartridge C, and the guided portions 50*b* and 60*b* are also disposed on both ends in the longitudinal direction of the toner cartridge C. Further, in the attaching direction D (FIG. 11B), the guided portions 50*b* and 60*b* are positioned upstream of the positioning bosses 50*a* and 60*a* in the attaching direction.

At first, the process cartridge B is attached to the printer body A. As illustrated in FIGS. 11A and 12A, the process cartridge B is inserted in the attaching direction D while being guide by the guide portions 108 and 109. In this state, on the drive side, the guide portion 109 is interposed between the upper boss 94, the tip boss 98, and the lower boss 96 in a state where the upper boss 94 and the tip boss 98 are supported on the guide portion 109. On the non-drive side, the guide portion 108 is interposed between the upper boss 93, the tip boss 97, and the lower boss 95 in a state where the upper boss 93 and the tip boss 97 are supported on the guide portion 108. Thereby, the process cartridge B moves in the attaching direction D while being guided by the guide portions 108 and 109. In other words, the attaching direction D of the process cartridge B is a direction in which the process cartridge B moves along the guide portions 108 and 109.

In further detail, the attaching direction D of the process cartridge B is a direction along a virtual straight line L1 that connects a lower surface of the upper boss 93, i.e., first guided portion, and a lower surface of the tip boss 97, i.e., second guided portion, as illustrated in FIGS. 16A and 16B when viewed in the longitudinal direction. The virtual straight line L1 is a common tangent that is tangent to the lower sides of the tip boss 97 and the upper boss 93. The direction along the virtual straight line L1 connecting the lower face of the upper boss 93 and the lower face of the tip boss 97 can be referred to as the attaching direction D since the process cartridge B is supported on the guide portion 108 at two points, which are the lower face of the tip boss 97 and the lower face of the upper boss 93, when being guided during attachment. The direction along a virtual straight line connecting the lower face of the tip boss 98 and the lower face of the upper boss 94 can also be referred to as the attaching direction D.

After attaching the process cartridge B to the printer body A, the toner cartridge C is attached to the printer body A. As illustrated in FIGS. 11B and 12B, the guided portions 50*b* and 60*b* of the toner cartridge C are respectively placed on the guide portions 108 and 109 of the printer body A and inserted to the attaching direction D. The direction in which the toner cartridge C moves along the guide portions 108 and 109 is an attaching direction of the toner cartridge C.

FIG. 12C illustrates a state in which the toner cartridge C has been attached to an insert complete position. In this state, the positioning bosses 50*a* and 60*a* (FIGS. 13A and 13B) of the toner cartridge C are inserted to the toner cartridge positioning portions 21*a* and 21*b* (FIG. 9B) of the process cartridge B. In this state, leading edge portions of the guided portions 50*b* and 60*b* in the attaching direction are separated from the guide portions 108 and 109, and trailing edge portions of the guided portions 50*b* and 60*b* come into contact with the guide portions 108 and 109. Thereby, the toner cartridge C is positioned on the process cartridge B.

Further, the position of the toner cartridge C within the printer body A is determined by the trailing edges of the guided portions 50*b* and 60*b* being in contact with the guide portions 108 and 109.

In a state where the door 107 is closed after attaching the process cartridge B and the toner cartridge C, the printer 1 is in a state ready to execute image formation.

The detachment of the toner cartridge C and the process cartridge B is performed by an opposite procedure as that described above. That is, after opening the door 107, at first, the toner cartridge C is drawn out toward an opposite direction as the attaching direction D, and thereafter, the process cartridge B is drawn out toward the opposite direction as the attaching direction D.

In the developing-roller contact state of the process cartridge B, when viewed in the longitudinal direction, a virtual straight line L2 connecting the rotational axis A11, i.e., first axis, of the photosensitive drum 11 and a rotational axis A16, i.e., second axis, of the developing roller 16 is approximately parallel to the virtual straight line L1 mentioned above. Specifically, an angle α formed by the virtual straight line L2 connecting the rotational axes A11 and A16 of the photosensitive drum 11 and the developing roller 16 and a straight line L1' in the attaching direction D that is parallel to the virtual straight line L1 can be set to fall within the range of 3.8°±5°.

The virtual straight line L2 is parallel to the virtual straight line L1 due to the following reason, for example. The process cartridge B is attached to the printer body A in an orientation where the cleaning unit 10 is at the leading side and the developing unit 15 positioned at the trailing side with the door 107 opened (FIG. 1 and FIGS. 12A to 12C). That is, the process cartridge B is attached to the printer body A in an orientation where the photosensitive drum 11 is positioned downstream of the developing roller 16 in the attaching direction D. Therefore, the angle of the virtual straight line L2 connecting the rotational axes A11 and A16 of the photosensitive drum 11 and the developing roller 16 is close to the virtual straight line L1 extending in the attaching direction D.

Further, components of the process cartridge B are arranged with a space formed therebetween, such that the space allows laser light Le (FIG. 1) radiated from the laser scanner 101 of the printer body A toward the photosensitive drum 11 to pass during the image-forming period. In the present embodiment, the laser scanner 101 is arranged above the process cartridge B and radiates laser light Le downward. Therefore, the developing roller 16 is in contact with the photosensitive drum 11 at a position between an exposing portion where laser light Le is radiated to the photosensitive drum 11 and a transfer portion where the photosensitive drum 11 faces the transfer roller 104 in the direction of rotation of the photosensitive drum 11, i.e., clockwise direction in FIG. 1. Actually, members other than the developing roller 16 included in the developing unit 15 are arranged so as not to interfere with the optical path of laser light Le and the conveyance path of the sheet S. Further, the transfer roller 104 is arranged at the opening portion of the frame body of the developing unit 15, and during attachment and detachment of the process cartridge B, the entire frame body of the developing unit 15 passes through the opening of the printer body A. Due to such limitations in arrangement, the developing roller 16 is preferably arranged to be aligned with the photosensitive drum 11 in the attaching direction D. That is, the virtual straight line L2 connecting the rotational axes A11 and A16 of the photosensitive drum 11 and the developing roller 16 is at an angle close to the virtual straight line L1 in the attaching direction D.

In the example, the process cartridge B includes a plurality of contacts E1 to E3 (FIG. 16B) for supplying power to the developing unit 15. The direction in which the contacts E1 to E3 are aligned is approximately parallel to the attaching direction D. The contact E1 enables voltage application to the developing roller 16 by being connected to a contact E4 (FIG. 11A) on the printer body A. The contact E2 enables voltage application to the supplying roller 13 by being connected to a contact E5 (FIG. 11A) on the printer body A. The contact E3 enables voltage application to the developing blade 18 by being connected to a contact E6 (FIG. 11A) on the printer body A. Since the contacts E1 to E3 are disposed independently, voltages to be applied to the developing roller 16, the supplying roller 13, and the developing blade 18 can be controlled independently. The contacts E1 to E3 are aligned along a virtual straight line L3. The virtual straight line L3 is a straight line connecting a face center of the contact E1 and a face center of the contact E3 when viewed in the longitudinal direction.

The plurality of contacts E1 to E3 of the developing unit 15 are aligned in a direction approximately parallel to the attaching direction D due to the following reasons. Projections such as bosses (93, 95, and 97) guided by the guide portion 108 of the printer body A are arranged on the side face portion of the process cartridge B in the longitudinal direction, such that it is desirable to arrange the contacts E1 to E3 at areas avoiding the projections in the direction orthogonal to the attaching direction D. Thereby, it becomes possible to easily allow the contacts E1 to E3 to be in contact with the contacts E4 to E6 on the printer body A by attaching the process cartridge B.

Downsizing of the developing unit 15 in the short direction can be realized by arranging the contacts E1 to E3 using the space between the upper boss 93 and the lower boss 95 of the process cartridge B. That is, the contacts E4 to E6 of the printer body are arranged on the guide portion 108 and the contacts E1 to E3 of the developing unit 15 are arranged at a position facing the guide portion 108. In this state, the contacts E1 to E3 are aligned in the attaching direction D, which is the direction in which the guide portion 108 extends, such that the contacts E1 to E3 can be arranged within the space between the upper boss 93 and the lower boss 95.

Waste Toner Conveyance Configuration Inside Cleaning Unit

Figure 14:
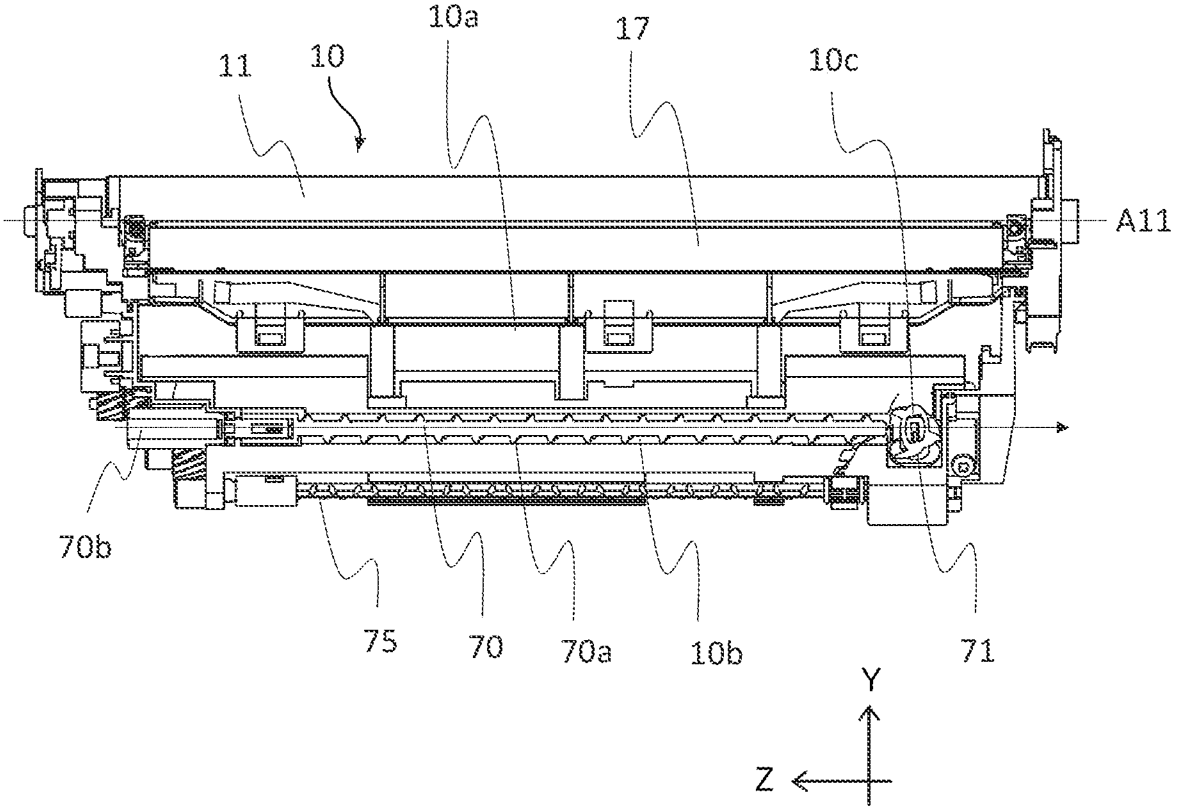
FIG. 14 is a cross-sectional view of a cleaning unit of the process cartridge according to the embodiment.

A waste toner conveyance configuration inside the cleaning unit 10 is described with reference to FIGS. 3, 4, and 14. FIG. 14 is a cross-sectional view in which a cross section of the cleaning unit 10 cut at a horizontal plane is viewed from above.

As illustrated in FIGS. 3, 4, and 14, the cleaning unit 10 includes the first waste toner conveyance path 10*b* that extends approximately in parallel with a rotational axis direction of the photosensitive drum 11, i.e., drum axis direction, and the second waste toner conveyance path that extends in a direction approximately orthogonal to the drum axis direction. A first waste toner conveyance unit 70 is arranged in the first waste toner conveyance path 10*b*, and a second waste toner conveyance unit 71 is arranged in the second waste toner conveyance path 10*c*. The second waste toner conveyance path 10*c* and the second waste toner conveyance unit 71 are arranged on an inner side from both end portions of the cleaning blade 17 in the drum axis direction (FIG. 14).

As mentioned above, waste toner on the photosensitive drum 11 is collected by the cleaning blade 17 into the waste toner primary storage portion 10*a*. In a state where the waste toner primary storage portion 10*a* is filled with waste toner, waste toner reaches the first waste toner conveyance path 10*b*. Waste toner having reached the first waste toner conveyance path is conveyed from one side in the drum axis direction toward the other side by a helical portion provided on the first waste toner conveyance unit 70, and reaches the second waste toner conveyance path 10*c*. Waste toner that has reached the second waste toner conveyance path 10*c* is conveyed by a helical portion 71*a* of the second waste toner conveyance unit 71 toward a direction orthogonal to the drum axis direction and upward of the cleaning blade 17. Further, waste toner being conveyed to an end portion of the second waste toner conveyance unit 71 is discharged through a waste toner discharge port 72 (FIG. 4) to the waste toner inlet 42*a* (FIG. 13) of the waste toner collecting portion 40. The waste toner discharge port 72 is an opening that is provided on the cleaning unit 10 for discharging waste toner from the process cartridge B. The waste toner inlet 42*a* is an opening disposed on the waste toner collecting portion 40 of the toner cartridge C for receiving waste toner discharged from the process cartridge B.

Drive Configuration of Waste Toner Conveyance Unit

Figure 15:
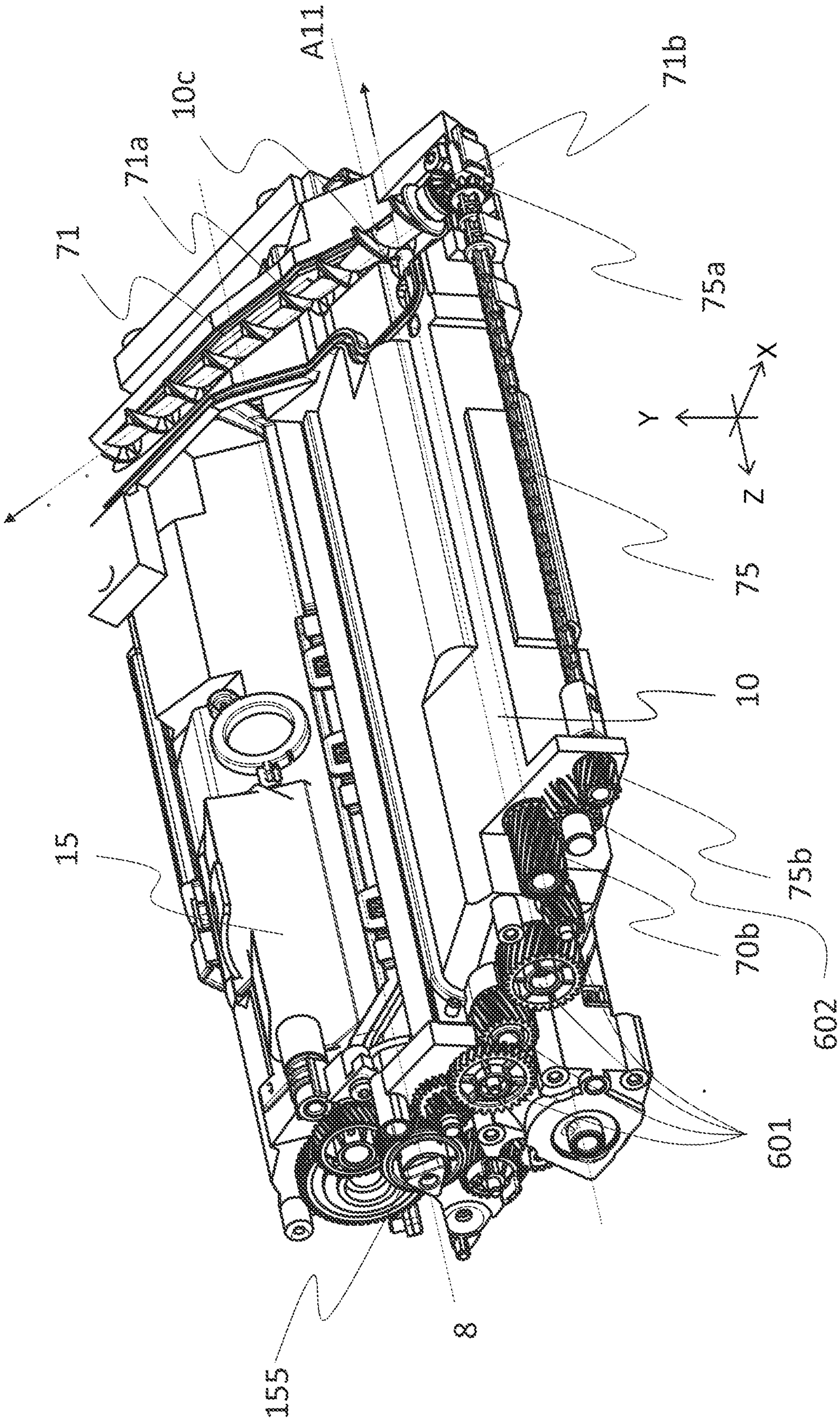
FIG. 15 is a perspective view of the process cartridge according to the embodiment.

The drive configuration of the first waste toner conveyance unit 70 and the second waste toner conveyance unit 71 will be described with reference to FIG. 15. FIG. 15 is a perspective view of the process cartridge B that illustrates the drive configuration of the waste toner conveyance unit. In FIG. 15, for sake of description, the side cover 7 and the bearing member 5 of the process cartridge B are omitted from the drawing.

As illustrated in FIG. 15, the cleaning unit 10 includes a drive gear 70*b* that transmits drive to the first waste toner conveyance unit 70, and a bevel gear 71*b* that transmits drive to the second waste toner conveyance unit 71. Drive is transmitted to the drive gear 70*b* via an idler gear train 601 from a developer coupling 155 disposed coaxially with the swing axis 8. The developer coupling 155 is one of input members through which drive is entered to the process cartridge B from the printer body A.

Drive is transmitted from the drive gear 70*b* via an idler gear 602 and a through shaft 75 to the bevel gear 71*b*. The through shaft 75 is a shaft member that passes through the cleaning unit 10 in the drum axis direction. A gear 75*b* that meshes with the idler gear 602 is disposed on one end of the through shaft 75, and a bevel gear 75*a* that meshes with the bevel gear 71*b* is disposed on the other end thereof. As described, the first waste toner conveyance unit 70 and the second waste toner conveyance unit 71 are driven in an interlocked manner by drive transmitted from the drive gear 70*b* via the idler gear 602 and the through shaft 75, by which waste toner is conveyed.

The bevel gear 71*b* and the bevel gear 75*a* can be replaced with a screw gear or a worm gear. According to the present embodiment, rotating speeds of the first waste toner conveyance unit 70 and the second waste toner conveyance unit 71 are the same, but in order to enhance conveyance efficiency, the rotating speed of the second waste toner conveyance unit 71 can be set higher than the rotating speed of the first waste toner conveyance unit 70.

Arrangement of Components of Process Cartridge in Short Direction

Figure 19:
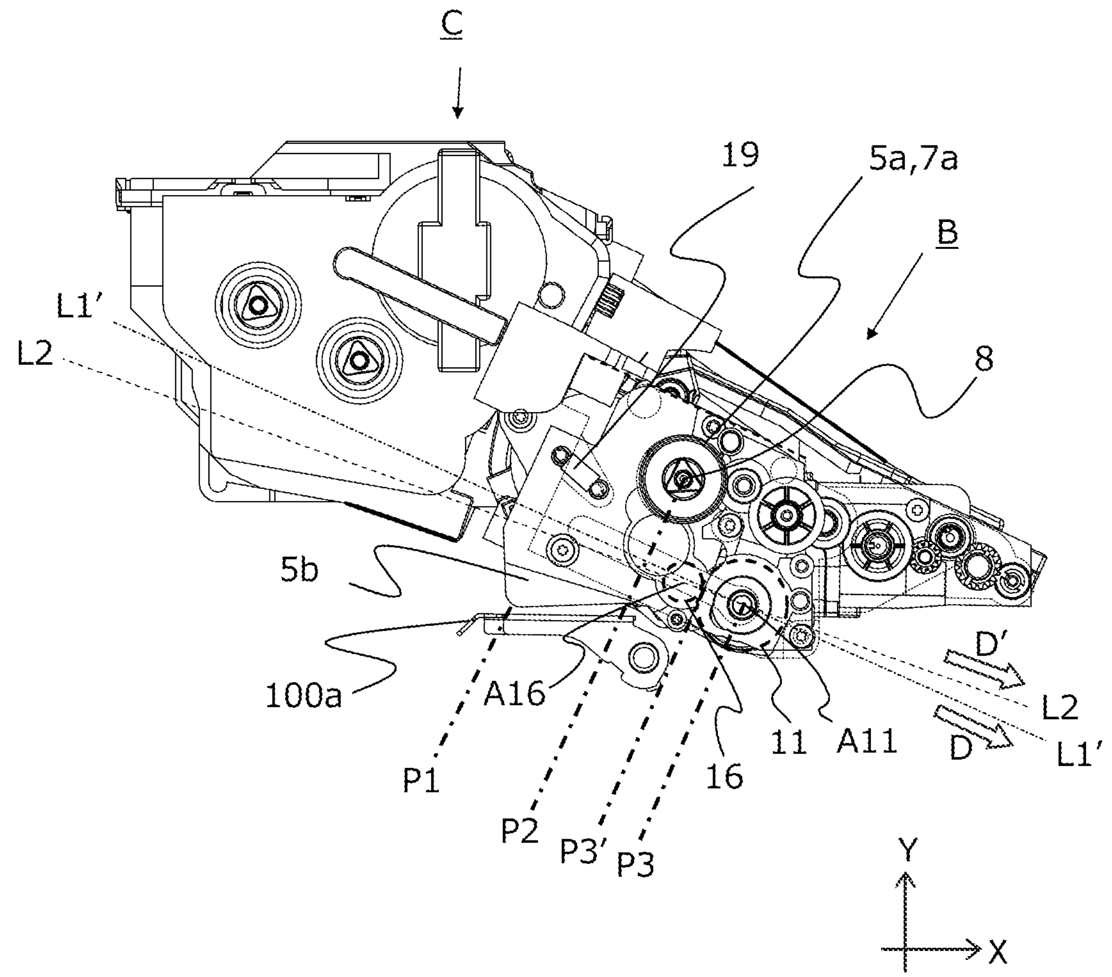
FIG. 19 is a side view of the process cartridge and the toner cartridge according to the embodiment.
Figure 20:
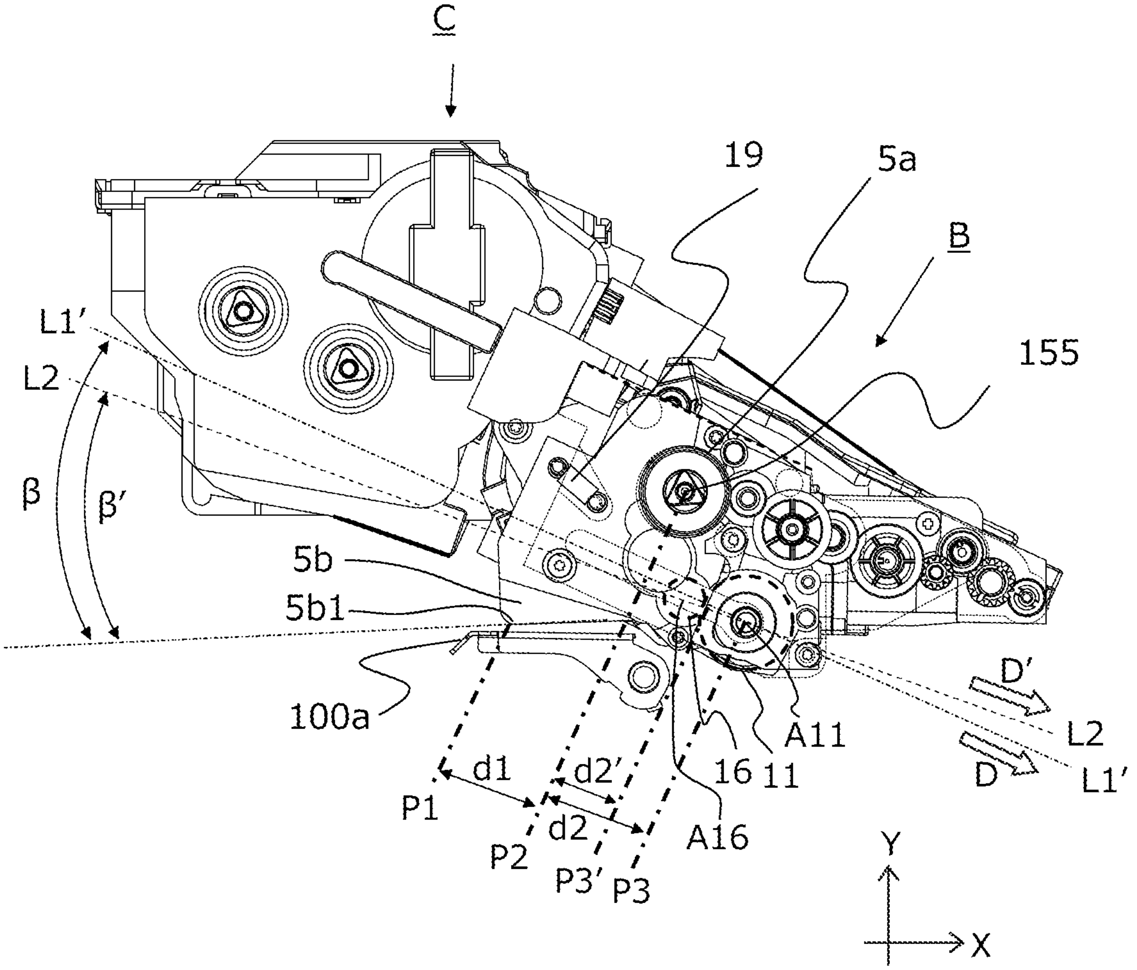
FIG. 20 is a side view of the process cartridge and the toner cartridge according to the embodiment.

An arrangement of components of the process cartridge B in the short direction regarding the movement of the developing unit 15 will be described. FIGS. 19 and 20 are each a side view of the process cartridge B, and the toner cartridge C, in the developing-roller contact state viewed from the drive side in the longitudinal direction. That is, FIGS. 19 and 20 each illustrate a state of the cartridge of the present embodiment viewed in the direction along the rotational axis, or first axis, of the photosensitive drum 11, i.e., axial direction, in a state where the developing unit 15, or second unit, is positioned at the contact position.

The virtual straight line L2 in FIGS. 19 and 20 is a straight line connecting the rotational axis A11, or first axis, of the photosensitive drum 11 and the rotational axis A16, i.e., second axis, of the developing roller 16, as described above. The virtual straight line L2 is approximately in parallel with the attaching direction D of the process cartridge B. That is, a direction from the developing roller 16 toward the photosensitive drum 11 along the virtual straight line L2, hereinafter referred to as an interaxial direction D', is approximately parallel to the attaching direction D.

(a) As illustrated in FIG. 19, the swing axis 8 of the developing unit 15 and the protruded portion 5*b* to be pressed by the separation lever 100*a* are arranged opposite to one another with respect to the virtual straight line L2. In other words, the swing axis (8) of the developing unit 15 (second unit) and the pressed portion (5*b*) are arranged on opposite sides to each other with respect to the virtual straight line (L2) connecting the first axis (A11) and the second axis (A16). According to this configuration, direction of rotating force acting on the developing unit 15 in a state where the protruded portion 5*b* contacts the separation lever 100*a* during attachment of the process cartridge B is a direction in which the developing unit 15 moves from the contact position toward the separated position, i.e., clockwise direction in the drawing.

(b) Further, as illustrated in FIG. 19, in the interaxial direction D' from the rotational axis Alb of the developing roller 16 toward the rotational axis A11 of the photosensitive drum 11, the protruded portion 5*b*, the swing axis 8, and the rotational axis A11 of the photosensitive drum 11 are arranged in the named order. In other words, the pressed portion, the swing axis, and the first axis are arranged in the named order in the interaxial direction (D') from the second axis (A16) toward the first axis (A11).

(c) Further, as illustrated in FIG. 20, if the positions of the protruded portion 5*b*, the swing axis 8, and the rotational axis A11 in the interaxial direction D' are referred to as P1, P2, and P3, a distance d1 from P1 to P2 is longer than a distance d2 from P2 to P3. In other words, a distance (d1) from the pressed portion (5*b*) to the swing axis (8) in the interaxial direction (D') is longer than a distance (d2) from the swing axis (8) to the first axis (A11) in the interaxial direction (D').

According to the configurations of (b) and (c) described above, in a state where the protruded portion 5*b* comes into contact with the separation lever 100*a* during attachment of the process cartridge B, the developing unit 15 can be moved from the contact position toward the separated position with smaller force. That is, compared to a case where the distance d1 is shorter than the distance d2, the distance from a point of support (swing axis 8) to a point of application of force (protruded portion 5*b*) of the developing unit 15 becomes longer, such that the developing unit 15 can be moved even if the force acting on the protruded portion 5*b* is small.

Regarding (b) described above, for example, it may be possible to arrange the protruded portion 5*b* on a same side, i.e., downstream side in the attaching direction D, as the rotational axis A11 of the photosensitive drum 11 with respect to the swing axis 8. However, in that case, the positional relationship causes the amount of protrusion of the protruded portion **5*b* in a state where the developing unit 15 swings from the contact position toward the separated position to be great, that is, the amount in which the protruded portion 5*b* invades the virtual straight line L2 becomes great, such that it becomes difficult to arrange the separation lever 100*a*. Further, according to the present embodiment, the distance in which the protruded portion 5*b* moves during attachment of the process cartridge B becomes long, such that the printer body A may be increased in size to ensure a space through which the protruded portion 5*b* passes. According to the present embodiment, the protruded portion 5*b* is arranged on an opposite side from the rotational axis A11 of the photosensitive drum 11 with respect to the swing axis 8**, that is, upstream in the attaching direction D, such that the space within the printer body A can be utilized more effectively.

Further, instead of (c) described above, as illustrated in FIG. 20, the distance d1 from P1 to P2 may be longer than a distance d2' from P2 to P3', where P3' is a position of a contact portion at which the photosensitive drum 11 contacts the developing roller in the interaxial direction. In other words, a distance (d1) from the pressed portion to the swing axis in the interaxial direction may be longer than a distance (d2') from the swing axis to a contact portion at which the image bearing member contacts the developer bearing member in the interaxial direction. With this configuration, the developing unit 15 can also be moved even if the force acting on the protruded portion **5*b*** is small.

As described above, the interaxial direction D' of the photosensitive drum 11 and the developing roller 16 is approximately parallel to the attaching direction D of the process cartridge B. Therefore, the configurations of (a), (b), and (c) described above can similarly be satisfied in a case where the attaching direction D is set as reference.

That is, as illustrated in FIG. 19, the swing axis (8) and the pressed portion (**5*b*) of the developing unit 15 (second unit) are arranged on opposite sides to each other with respect to a virtual straight line (L1') that passes the first axis (A11) and that extends in the attaching direction (D). According to this configuration, the direction of rotating force acting on the developing unit 15 in a state where the protruded portion 5*b* comes into contact with the separation lever 100*a* during attachment of the process cartridge B is the direction in which the developing unit 15** moves from the contact position to the separated position.

Further, as illustrated in FIG. 19, the pressed portion (**5*b*), the swing axis (8), and the first axis (A11) are arranged in the named order in the attaching direction (D). The distance from the pressed portion (5*b*) to the swing axis (8) in the attaching direction (D) is longer than the distance from the swing axis (8) to the first axis (A11) in the attaching direction (D). According to this configuration, in a state where the protruded portion 5*b* comes into contact with the separation lever 100*a* during attachment of the process cartridge B, the developing unit 15** can be moved from the contact position to the separated position with smaller force.

Note that, the distance from the protruded portion **5*b* to the swing axis 8 in the attaching direction D may be longer than, instead of the distance from the swing axis 8 to the rotational axis A11 of the photosensitive drum 11 in the attaching direction D, a distance from the swing axis 8 to the contact portion at which the photosensitive drum 11 contacts the developing roller 16. In other words, a distance from the pressed portion to the swing axis in the attaching direction D may be longer than a distance from the swing axis to a contact portion at which the image bearing member contacts the developer bearing member in the attaching direction D. With this configuration, the developing unit 15 can also be moved even if the force acting on the protruded portion 5*b*** is small.

Movement of Developing Unit During Attachment of Cartridge

Figure 21A:
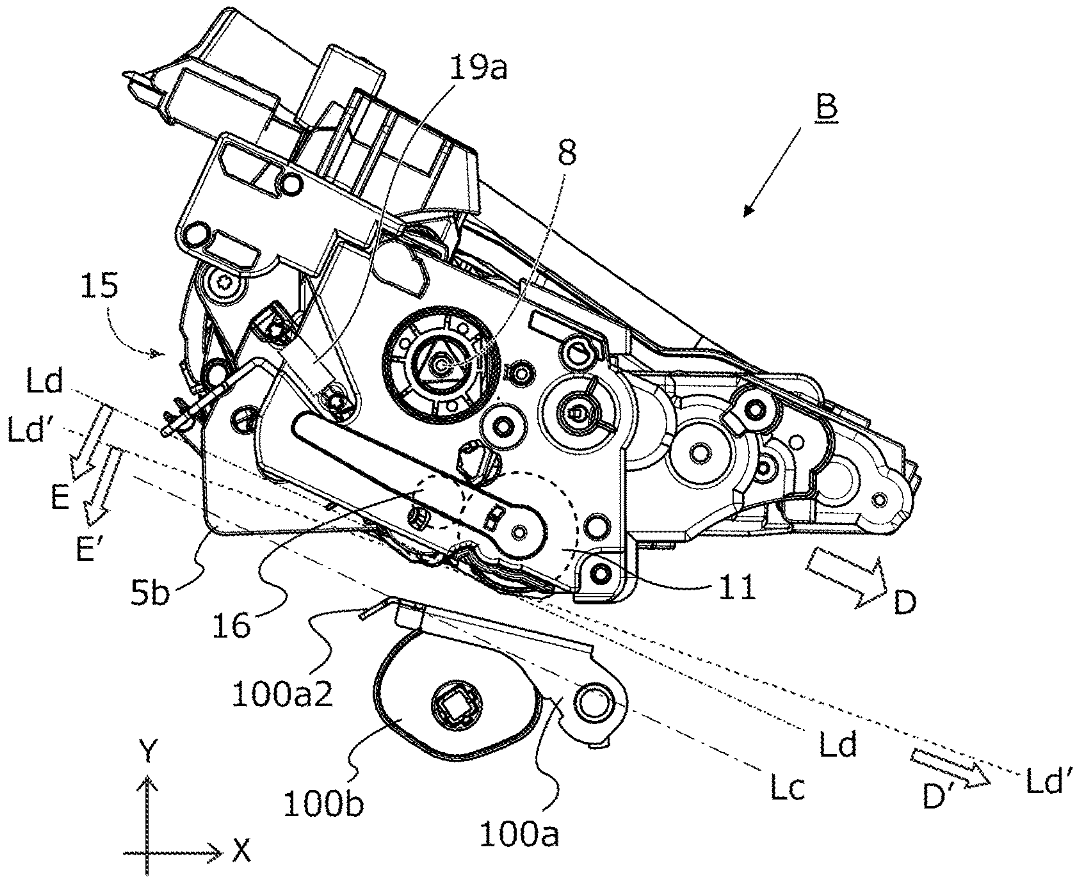
FIGS. 21A and 21B are each a drawing illustrating a movement of a developing unit during attachment of a cartridge according to the embodiment.
Figure 21B:
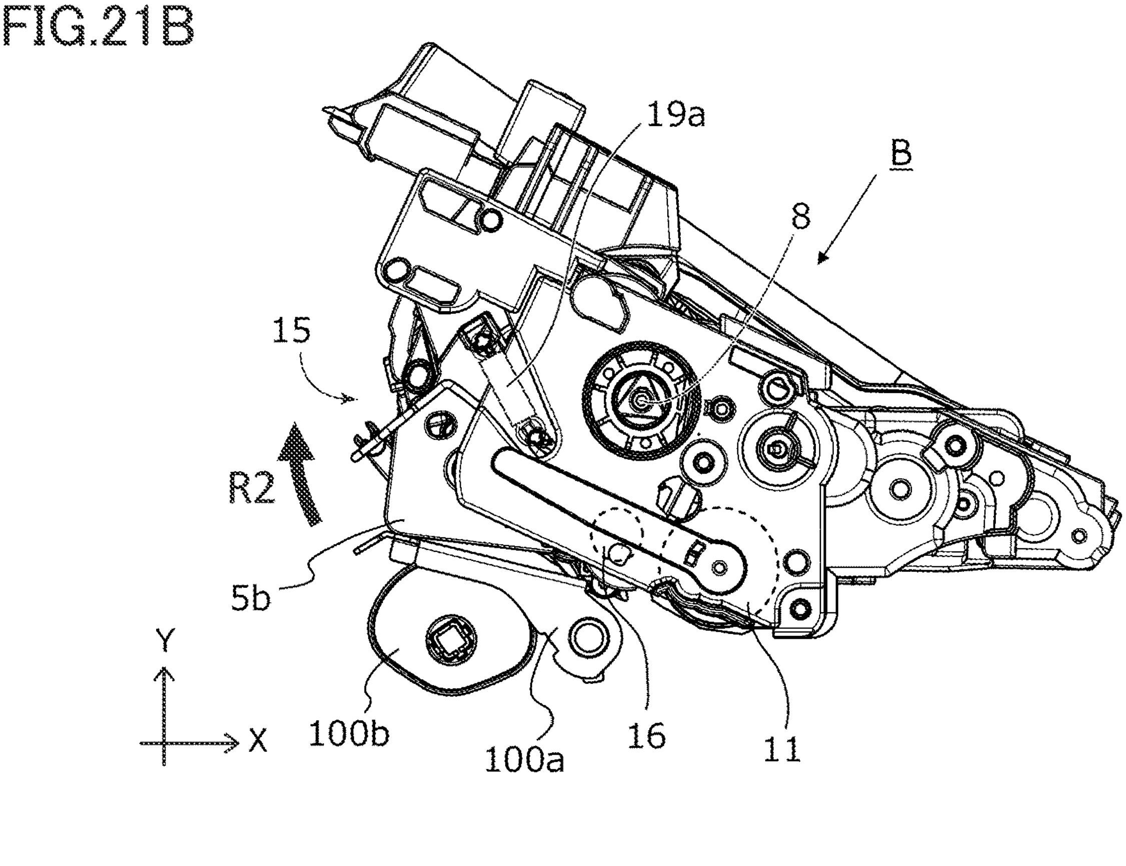

Movement of the developing unit 15 when attaching the process cartridge B to the printer body A will be described with reference to FIGS. 21A and 21B. FIG. 21A illustrates a state in midway of operation of attaching the process cartridge B to the printer body A toward the direction of arrow D in a state where the separation lever **100*a* is positioned at a position retaining the developing unit 15 at the separated position (similar to FIG. 10B). FIG. 21B illustrates a state in which the process cartridge B has been inserted to a position where the attachment thereof to the printer body A is completed from the state of FIG. 21**A.

According to the present embodiment, even if the separation lever **100*a* is positioned at either a position retaining the developing unit 15 at the separated position or a position not in contact with the protruded portion 5*b*, attachment and detachment of the process cartridge B is enabled. In the following description, a case is illustrated where the process cartridge B is attached in a state where the separation lever 100*a* is at a position retaining the developing unit 15** at the separated position.

As illustrated in FIG. 21A, in a state prior to having the protruded portion **5*b* of the developing unit 15 contact the separation lever 100*a*, the developing unit 15 is retained at the contact position by urging force of the pressurizing springs 19*a* and 19*b***.

In a state where the process cartridge B is gradually inserted toward the attaching direction D from the state illustrated in FIG. 21A, the protruded portion **5*b* comes into contact with the separation lever 100*a*. A dot and dash line Lc of FIG. 21A is a straight line drawn in the attaching direction D, and the protruded portion 5*b* first comes into contact with the separation lever 100*a*** on the dot and dash line Lc.

Since the separation lever **100*a* is retained by the separation cam 100*b*, rotating force in the clockwise direction in the drawing (arrow R2) with respect to the swing axis 8 acts on the developing unit 15 by having the protruded portion 5*b* pressed by the separation lever 100*a*. Thereby, as illustrated in FIG. 21B, at a point of time when attachment of the process cartridge B is completed, the movement of the developing unit 15** to the separated position is completed, and the process cartridge B is in the developing-roller separated state.

Now, according to the configurations of (a) to (c) described above, in a state where the protruded portion **5*b* comes into contact with the separation lever 100*a* during attachment of the process cartridge B, the developing unit 15 moves to the separated position by a relatively small force. That is, according to the configuration of the present embodiment, the developing unit 15 can be moved smoothly during attachment of the cartridge. Further, since it is possible to prevent a large load to be applied to move the developing unit 15** during attachment of the cartridge, attachment of the process cartridge B becomes easy and the usability is improved.

Detailed Arrangement of Components in Short Direction

As illustrated in FIG. 21A, in a state where the developing unit 15 is positioned at the contact position, when viewed in the longitudinal direction, the protruded portion **5*b*, or pressed portion, is protruded further downward than a lower edge position of the photosensitive drum 11 in a direction E orthogonal to the attaching direction D. That is, the protruded portion 5***b* is protruded downward with respect to a tangent Ld that is tangent to a lower side of the photosensitive drum 11 and that extends in the attaching direction D. Further, as illustrated in FIG. 21A, when viewed in the longitudinal direction in a state where the developing unit 15 is positioned at the contact position, the protruded portion 5*b*, or pressed portion, is protruded further downward than a lower edge position of the photosensitive drum 11 in a direction E' orthogonal to the interaxial direction D'. In other words, the protruded portion 5*b* protrudes downward with respect to a tangent Ld' that is tangent to a lower side of the photosensitive drum 11 and that extends in the interaxial direction D' described above.

According to this configuration, the movement of the developing unit 15 during attachment of the cartridge can be easily realized. Specifically, as illustrated in FIG. 21A, the protruded portion 5*b* is arranged to b e in contact with the separation lever 100*a* at a position where the separation lever 100*a* is not superposed with a movement locus of the photosensitive drum 11, i.e., lower than Ld, during attachment of the cartridge when viewed in the longitudinal direction.

Further, as illustrated in FIG. 20, in a state where the developing unit 15 is positioned at the contact position, when viewed in the longitudinal direction, an angle β between the attaching direction D and a direction in which the protruded portion 5*b* extends downstream in the attaching direction D from a tip 5*b*1 of the protruded portion 5*b* is an acute angle. Further, in a state where the developing unit 15 is positioned at the contact position, when viewed in the longitudinal direction, an angle β' between the interaxial direction D' and a direction in which the protruded portion 5*b* extends downstream in the interaxial direction D' from the tip 5*b*1 of the protruded portion 5*b* is an acute angle.

According to this configuration, the force that the protruded portion 5*b* receives when the protruded portion 5*b* comes into contact with the separation lever 100*a* during attachment of the cartridge can easily act in the direction of swinging the developing unit 15 toward the separated position, and the developing unit 15 can be moved even more smoothly. Further, the possibility of the protruded portion 5*b* colliding strongly against the separation lever 100*a* and causing the protruded portion 5*b* or the separation lever 100*a* to be damaged is reduced. Angles β and β' are preferably 60° or less, and more preferably 45° or less.

Further, it is preferable to provide an inclined portion 100*a*2 at a tip portion, i.e., upstream edge in the attaching direction D or upstream edge in the interaxial direction D', of the separation lever 100*a*. As illustrated in FIG. 21A, in a state where the separation lever 100*a* is at a position retaining the developing unit 15 at the separated position, the inclined portion 100*a*2 is inclined such that a more upstream portion thereof in the attaching direction D is more distant from the protruded portion 5*b*. Thereby, the possibility of the protruded portion 5*b* being caught during attachment of the cartridge can be reduced.

Arrangement of Components of Process Cartridge in Longitudinal Direction

Figure 22:
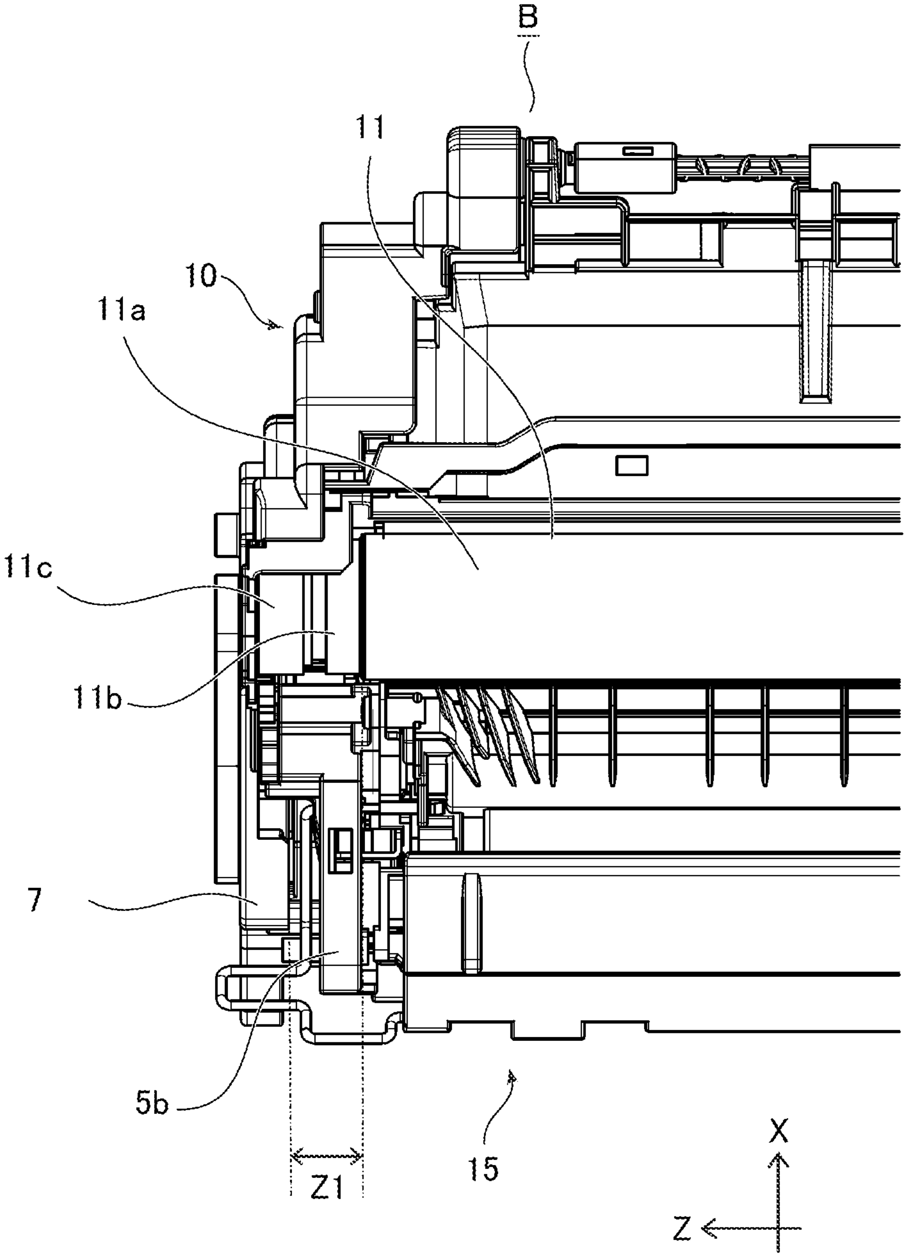
FIG. 22 is a bottom view of the process cartridge according to the embodiment.

Arrangement of components of the process cartridge B in the longitudinal direction with respect to the movement of the developing unit 15 will be described. FIG. 22 is a bottom view of the process cartridge B, that is, viewed in the Y direction.

As illustrated in FIG. 22, the protruded portion 5*b* of the developing unit 15 is arranged within an area Z1 between the side cover 7 of the cleaning unit 10 and an end portion, on the same side as the side cover 7, of an outer circumference surface 11*a* of the photosensitive drum 11 in the longitudinal direction (arrow Z). In other words, the pressed portion (5*b*) is arranged between the cover member and an end portion on a first side (cover member side) of the outer circumference surface of the image bearing member in an axial direction (Z) along the first axis.

According to this configuration, the protruded portion 5*b* serving as the pressed portion is arranged near the side cover 7 supporting the developing unit 15 in a swingable manner, such that torsional deformation of the developing unit 15 in a state where the protruded portion 5*b* is pressed can be suppressed. Further, since the protruded portion 5*b* is positioned on an outer side of the outer circumference surface 11*a* of the photosensitive drum 11 in the longitudinal direction, the possibility of the separation lever 100*a* in contact with the protruded portion 5*b* coming into contact with the outer circumference surface 11*a* of the photosensitive drum 11 during attachment of the cartridge can be reduced.

As illustrated in FIG. 22, the photosensitive drum 11 includes drum gears 11*b* and 11*c* that are disposed on an outer side of the outer circumference surface 11*a* serving as a photosensitive surface, or image bearing surface. The position of the protruded portion 5*b* in the longitudinal direction can be set to a position overlapped with the position of the drum gear 11*c* in the longitudinal direction. According to this configuration, downsizing of the process cartridge B in the longitudinal direction is enabled.

One of the gears of the drum gears 11*b* and 11*c* serve as a gear for inputting rotational driving force to the photosensitive drum 11 and the other gear serves as a gear for generating thrust force in the longitudinal direction and positioning the photosensitive drum 11 in the longitudinal direction. However, a configuration can be adopted in which the photosensitive drum 11 is equipped with only a gear for inputting the rotational driving force.

Other Embodiments

In the above-mentioned embodiment, a configuration has been illustrated in which the developing unit 15 is retained at the contact position by urging force of the pressurizing springs 19*a* and 19*b* in a state where the protruded portion 5*b* of the developing unit 15 is not in contact with the separation lever 100*a*. Alternatively, for example, a configuration can be adopted in which, in a state where no pressurizing springs 19*a* and 19*b* are provided and the protruded portion is not in contact with the separation lever 100*a*, the developing unit 15 can be retained at the contact position by the own weight of the developing unit 15. Even according to this configuration, based on the configuration illustrated in the embodiment, a smooth movement of the developing unit 15 during attachment of the cartridge is enabled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-102263, filed on Jun. 24, 2022, which is hereby incorporated by reference herein in its entirety.

What is claimed is:

1. A cartridge configured to be attached to and detached from an apparatus body of an image forming apparatus, the cartridge comprising:

a first unit including an image bearing member configured to rotate about a first axis; and a second unit including a developer bearing member configured to rotate about a second axis and to bear and supply developer to the image bearing member, wherein the second unit is swingable with respect to the first unit, about a swing axis that is parallel to the first axis, between a contact position in which the developer bearing member is in contact with the image bearing member and a separated position in which the developer bearing member is separated from the image bearing member, wherein the second unit includes a pressed portion to be pressed by a pressing member of the apparatus body, and the second unit is configured to move from the contact position to the separated position in a case where the pressed portion is pressed, wherein, in a state where the second unit is positioned at the contact position, when viewed in an axial direction along the first axis, (i) the swing axis and the pressed portion are arranged on opposite sides of a virtual straight line connecting the first axis and the second axis, (ii) the pressed portion, the swing axis, and the first axis are arranged in the named order in an interaxial direction from the second axis toward the first axis along the virtual straight line, and (iii) a distance from the pressed portion to the swing axis in the interaxial direction is longer than a distance from the swing axis to the first axis in the interaxial direction, wherein the first unit includes a cover member that forms a first side face portion on a first side of the first unit in the axial direction and is configured to rotatably support the image bearing member, wherein the second unit is configured to be swingably supported by the cover member, and wherein the pressed portion is arranged between the cover member and an end portion on a first side of an outer circumference surface of the image bearing member in the axial direction.

2. The cartridge according to claim 1, further comprising:

a gear arranged between the cover member and the end portion on the first side of the outer circumference surface of the image bearing member in the axial direction, the gear being configured to rotate about the first axis, and wherein a position of the pressed portion in the axial direction and a position of the gear in the axial direction overlap.

3. The cartridge according to claim 1, wherein, in a state where the second unit is positioned at the contact position, when viewed in the axial direction, the pressed portion protrudes further downward than a lower edge position of the image bearing member in a direction orthogonal to the interaxial direction.

4. The cartridge according to claim 1, wherein, in a state where the second unit is positioned at the contact position, when viewed in the axial direction, an angle between the interaxial direction from the second axis toward the first axis and a direction in which the pressed portion extends downstream in the interaxial direction from the second axis toward the first axis from a tip of the pressed portion is an acute angle.

5. The cartridge according to claim 1, wherein the second unit includes a bearing member that rotatably supports the developer bearing member on the first side in the axial direction, wherein a projecting portion disposed on either one of the cover member and the bearing member is fit to a recess portion disposed on the other one of the cover member and the bearing member such that the second unit is swingably supported about the swing axis on the first unit, and wherein the pressed portion is a part of the bearing member.

6. The cartridge according to claim 1, further comprising:

a first guided portion disposed on one of the first side face portion and a second side face portion of the first unit, the second side face portion being provided on a second side opposite to the first side of the first unit in the axial direction; and a second guided portion that is disposed on the one of the first side face portion and the second side face portion of the first unit and is arranged at a position separated from the first guided portion, wherein the cartridge is configured to be guided to be attached to the apparatus body while having the first guided portion and the second guided portion supported on a guide portion of the apparatus body, and wherein the interaxial direction is approximately parallel to a direction of a virtual straight line in contact with a lower face of the first guided portion and a lower face of the second guided portion.

7. The cartridge according to claim 1, further comprising an urging member connected to the first unit and the second unit, the urging member being configured to urge the second unit toward the contact position, wherein the second unit is configured to be retained at the contact position by an urging force of the urging member in a state where the pressed portion is not pressed, and the second unit is configured to move to the separated position against the urging force of the urging member in a case where the pressed portion is pressed.

8. The cartridge according to claim 1, wherein the interaxial direction is approximately parallel to an attaching direction in which the cartridge is attached to the apparatus body.

9. An image forming apparatus comprising:

the cartridge according to claim 1; and an apparatus body to which the cartridge is attached, wherein the apparatus body includes a guide portion configured to guide the cartridge, and wherein the cartridge is attached in a direction along the guide portion to the apparatus body.

10. A cartridge configured to be attached to and detached from an apparatus body of an image forming apparatus, the cartridge comprising:

a first unit including an image bearing member configured to rotate about a first axis; and a second unit including a developer bearing member configured to rotate about a second axis and to bear and supply developer to the image bearing member, wherein the cartridge is configured to be attached to the apparatus body in an attaching direction that is orthogonal to the first axis, wherein the second unit is swingable with respect to the first unit, about a swing axis that is parallel to the first axis, between a contact position in which the developer bearing member is in contact with the image bearing member and a separated position in which the developer bearing member is separated from the image bearing member, wherein the second unit includes a pressed portion to be pressed by a pressing member of the apparatus body, and the second unit is configured to be moved from the contact position to the separated position in a case where the pressed portion is pressed, wherein, in a state where the second unit is positioned at the contact position, when viewed in an axial direction along the first axis, (i) the swing axis and the pressed portion are arranged on opposite sides of a virtual straight line that passes the first axis and that extends in the attaching direction, (ii) the pressed portion, the swing axis, and the first axis are arranged in the named order in the attaching direction, and (iii) a distance from the pressed portion to the swing axis in the attaching direction is longer than a distance from the swing axis to the first axis in the attaching direction, wherein the first unit includes a cover member that forms a first side face portion on a first side of the first unit in the axial direction and is configured to rotatably support the image bearing member, wherein the second unit is configured to be swingably supported by the cover member, and wherein the pressed portion is arranged between the cover member and an end portion on the first side of an outer circumference surface of the image bearing member in the axial direction.

11. The cartridge according to claim 10, further comprising:

a gear arranged between the cover member and the end portion on the first side of the outer circumference surface of the image bearing member in the axial direction, the gear being configured to rotate about the first axis, and wherein a position of the pressed portion in the axial direction and a position of the gear in the axial direction overlap.

12. The cartridge according to claim 10, wherein, in a state where the second unit is positioned at the contact position, when viewed in the axial direction, the pressed portion protrudes further downward than a lower edge position of the image bearing member in a direction orthogonal to the attaching direction.

13. The cartridge according to claim 10, wherein, in a state where the second unit is positioned at the contact position, when viewed in the axial direction, an angle between the attaching direction and a direction in which the pressed portion extends downstream in the attaching direction from a tip of the pressed portion is an acute angle.

14. The cartridge according to claim 10, wherein the second unit includes a bearing member that rotatably supports the developer bearing member on the first side in the axial direction, wherein a projecting portion disposed on either one of the cover member and the bearing member is fit to a recess portion disposed on the other one of the cover member and the bearing member such that the second unit is swingably supported about the swing axis on the first unit, and wherein the pressed portion is a part of the bearing member.

15. The cartridge according to claim 10, further comprising:

a first guided portion disposed on one of the first side face portion and a second side face portion of the first unit, the second side face portion being provided on a second side opposite to the first side of the first unit in the axial direction; and a second guided portion that is disposed on the one of the first side face portion and the second side face portion of the first unit and that is arranged at a position separated from the first guided portion, wherein the cartridge is configured to be guided to be attached to the apparatus body while having the first guided portion and the second guided portion supported on a guide portion of the apparatus body, and wherein the attaching direction is a direction of a virtual straight line in contact with a lower face of the first guided portion and a lower face of the second guided portion.

16. The cartridge according to claim 10, further comprising an urging member connected to the first unit and the second unit, the urging member being configured to urge the second unit toward the contact position, wherein the second unit is configured to be retained at the contact position by an urging force of the urging member in a state where the pressed portion is not pressed, and the second unit is configured to move to the separated position against the urging force of the urging member in a case where the pressed portion is pressed.

17. An image forming apparatus comprising:

the cartridge according to claim 10; and an apparatus body to which the cartridge is attached, wherein the apparatus body includes a guide portion configured to guide the cartridge, and wherein the cartridge is attached in a direction along the guide portion to the apparatus body.

18. A cartridge configured to be attached to and detached from an apparatus body of an image forming apparatus, the cartridge comprising:

a first unit including an image bearing member configured to rotate about a first axis; and a second unit including a developer bearing member configured to rotate about a second axis and to bear and supply developer to the image bearing member, wherein the second unit is swingable with respect to the first unit, about a swing axis that is parallel to the first axis, between a contact position in which the developer bearing member is in contact with the image bearing member and a separated position in which the developer bearing member is separated from the image bearing member, wherein the second unit includes a pressed portion to be pressed by a pressing member of the apparatus body, and the second unit is configured to be moved from the contact position to the separated position in a case where the pressed portion is pressed, wherein, in a state where the second unit is positioned at the contact position, when viewed in an axial direction along the first axis, (i) the swing axis and the pressed portion are arranged on opposite sides of a virtual straight line connecting the first axis and the second axis, (ii) the pressed portion, the swing axis, and the first axis are arranged in the named order in an interaxial direction from the second axis toward the first axis along the virtual straight line, and (iii) a distance from the pressed portion to the swing axis in the interaxial direction is longer than a distance from the swing axis to a contact portion at which the image bearing member contacts the developer bearing member in the interaxial direction, wherein the first unit includes a cover member that forms a first side face portion on a first side of the first unit in the axial direction and is configured to rotatably support the image bearing member, wherein the second unit is configured to be swingably supported by the cover member, and wherein the pressed portion is arranged between the cover member and an end portion on the first side of an outer circumference surface of the image bearing member in the axial direction.

* * * * *